US012726867B2

(12) United States Patent
Yao et al.

(10) Patent No.: US 12,726,867 B2
(45) Date of Patent: Sep. 1, 2026

(54) COMMUNICATION METHOD AND APPARATUS

(71) Applicant: Huawei Technologies Co., Ltd., Shenzhen (CN)

(72) Inventors: Chuting Yao, Beijing (CN); Ao Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 18/262,531

(22) PCT Filed: Dec. 9, 2021

(86) PCT No.: PCT/CN2021/136654
§ 371 (c)(1),
(2) Date: Jul. 21, 2023

(87) PCT Pub. No.: WO2022/156416
PCT Pub. Date: Jul. 28, 2022

(65) Prior Publication Data

US 2024/0080729 A1 Mar. 7, 2024

(30) Foreign Application Priority Data

Jan. 22, 2021 (CN) ......................... 202110086421.0
Mar. 2, 2021 (CN) ......................... 202110230452.9

(51) Int. Cl.
*H04W 4/00* (2018.01)
*H04L 69/04* (2022.01)
(Continued)

(52) U.S. Cl.
CPC ........... *H04W 36/023* (2013.01); *H04L 69/04* (2013.01); *H04W 36/0016* (2013.01); *H04W 36/08* (2013.01)

(58) Field of Classification Search
CPC ........... H04W 36/023; H04W 36/0016; H04W 36/08; H04W 80/02; H04W 8/24;
(Continued)

(56) References Cited

U.S. PATENT DOCUMENTS 10,110,360 B2 * 10/2018 Bressanelli ........... H04L 5/0055
10,470,090 B2 * 11/2019 Balasubramanian ........................ H04W 36/0033

(Continued)

FOREIGN PATENT DOCUMENTS

CN 201248581 6/2009
CN 101997660 A 3/2011

(Continued)

OTHER PUBLICATIONS

CATT, UDC Impacts of DAPS, 3GPP TSG RAN WG2 #109_e R2-2000896, Revision of R2-1914484, Feb. 14, 2020, 5 pages.

(Continued)

*Primary Examiner* — Phuongchau Ba Nguyen
(74) *Attorney, Agent, or Firm* — Conley Rose, P.C.

(57) ABSTRACT

A communication method includes a terminal device sending M compressed data packets. The M compressed data packets are obtained by compressing M data packets based on a first buffer. The terminal device reestablishes a PDCP layer without resetting the first buffer. The terminal device then sends N compressed data packets. The N compressed data packets are a part or all of the M compressed data packets. When reestablishing the PDCP layer, the terminal device does not reset the first buffer. In this case, if the terminal device needs to retransmit a data packet, the terminal device may retransmit a previously obtained compressed data packet, and does not need to compress the data packet again.

20 Claims, 13 Drawing Sheets

(51) Int. Cl.
*H04W 36/00* (2009.01)
*H04W 36/02* (2009.01)
*H04W 36/08* (2009.01)

(58) Field of Classification Search
CPC ..... H04W 28/04; H04W 28/06; H04W 28/14; H04W 80/04; H04W 88/06; H04W 88/08; H04W 84/18; H04L 69/04; H04L 1/1614; H04L 1/1874; H04L 29/06
See application file for complete search history.

(56) References Cited

U.S. PATENT DOCUMENTS

| | | | | |
|---|---|---|---|---|
| 10,897,399 | B2 | 1/2021 | Jin et al. | |
| 12,225,408 | B2 * | 2/2025 | Wang | H04L 69/04 |
| 12,309,243 | B2 * | 5/2025 | Yao | H04L 1/1835 |
| 12,375,430 | B2 * | 7/2025 | Yao | H04L 47/32 |
| 2016/0142934 | A1 | 5/2016 | Ahmadzadeh et al. | |
| 2016/0142951 | A1 | 5/2016 | Balasubramanian et al. | |
| 2016/0286008 | A1 * | 9/2016 | Perez Martinez | H03M 7/3084 |
| 2017/0041767 | A1 | 2/2017 | Vajapeyam et al. | |
| 2017/0318508 | A1 | 11/2017 | Berglund et al. | |
| 2018/0083688 | A1 * | 3/2018 | Agiwal | H04W 80/02 |
| 2019/0141571 | A1 | 5/2019 | Kim et al. | |
| 2019/0149421 | A1 | 5/2019 | Jin et al. | |
| 2020/0275311 | A1 * | 8/2020 | Zhao | H04W 28/06 |
| 2022/0159100 | A1 * | 5/2022 | Xu | H04L 63/0428 |
| 2023/0300222 | A1 * | 9/2023 | Kanamarlapudi | H04L 69/04 455/72 |
| 2024/0080729 | A1 * | 3/2024 | Yao | H04L 69/04 |

FOREIGN PATENT DOCUMENTS

| | | | |
|---|---|---|---|
| CN | 107495782 | A | 12/2017 |
| CN | 109196902 | A | 1/2019 |
| CN | 112218348 | A | 1/2021 |
| EP | 3665973 | | 8/2021 |
| JP | 2017539152 | A | 12/2017 |
| JP | 2018526894 | A | 9/2018 |

OTHER PUBLICATIONS

3GPP TS 38.323 V16.2.0, Sep. 2020, 3rd Generation Partnership Project; Technical Specification Group Radio Access Network; NR; Packet Data Convergence Protocol (PDCP) specification (Release 16), 40 pages.

3GPP TS 38.331 V16.3.1, Jan. 2021, 3rd Generation Partnership Project; Technical Specification Group Radio Access Network; NR; Radio Resource Control (RRC) protocol specification (Release 16), 937 pages.

* cited by examiner

| Hyper frame number | Sequence number |
|---|---|

COMMUNICATION METHOD AND APPARATUS

CROSS-REFERENCE TO RELATED APPLICATIONS

This is a National Stage of International Patent Application No. PCT/CN2021/136654 filed on Dec. 9, 2021, which claims priority to Chinese Patent Application No. 202110086421.0 filed on Jan. 22, 2021, and Chinese Patent Application No. 202110230452.9 filed on Mar. 2, 2021. All of the aforementioned applications are incorporated herein by reference in their entireties.

TECHNICAL FIELD

This application relates to the field of communication technologies, and in particular, to a communication method and apparatus.

BACKGROUND

In acknowledged mode (acknowledged mode, AM) transmission in a long term evolution (long term evolution, LTE) system, an uplink data compression (uplink data compression, UDC) technology is introduced and implemented at a packet data convergence protocol (packet data convergence protocol, PDCP) layer. For some data packets with a large amount of repeated content, for example, data packets for transmitting a session initiation protocol (session initiation protocol, SIP) in a voice over LTE (voice over long term evolution. VoLTE) network service, the UDC technology is used to transmit different parts between the data packets, to reduce an amount of to-be-transmitted data.

When a terminal device undergoes a cell handover, the terminal device reestablishes a PDCP layer, and a buffer (buffer) corresponding to the UDC technology is also reset (reset). The buffer is used for compressing a data packet. However, before the cell handover, a base station may not correctly receive a data packet from the terminal device. For example, the terminal device sends a plurality of data packets, and a part of the data packets may not be received by the base station. Therefore, the terminal device needs to retransmit the data packets. Because the buffer used for compressing the data packet is reset, when retransmitting the data packet, the terminal device needs to compress the data packet again based on a reset buffer. That is, the terminal device may need to compress a same data packet twice. This undoubtedly increases processing time of the terminal device, and reduces processing efficiency.

SUMMARY

Embodiments of this application provide a communication method and apparatus, to reduce a quantity of times of compression by a terminal device, so as to correspondingly improve processing efficiency of the terminal device.

According to a first aspect, a first communication method is provided. The method may be performed by a terminal device, or may be performed by a chip system or another function module. The chip system or the function module can implement a function of the terminal device. The method includes: sending M compressed data packets, where the M compressed data packets are obtained by compressing M data packets based on a first buffer, and M is a positive integer: reestablishing a PDCP layer without resetting the first buffer; and sending N compressed data packets, where the N compressed data packets are a part or all of the M compressed data packets, and N is a positive integer less than or equal to M.

In this embodiment of this application, when reestablishing the PDCP layer, the terminal device does not reset the first buffer. In this case, if the terminal device needs to retransmit a data packet, the terminal device may retransmit a previously obtained compressed data packet, and does not need to compress the data packet again. This reduces a quantity of compression times of the data packet, reduces processing time of the terminal device, and improves processing efficiency. In addition, because workload of the terminal device is reduced, power consumption of the terminal device is reduced.

With reference to the first aspect, in a first optional implementation of the first aspect, the method further includes; receiving a status report, where the status report indicates a compressed data packet that has been received by a network device (a first network device or a second network device). For example, the status report indicates K compressed data packets. After receiving the status report, the terminal device may learn that the network device receives the K compressed data packets. For example, the status report may be implemented by using a bitmap (bitmap). A quantity of bits included in the bitmap may be M. and the M bits are in a one-to-one correspondence with the M compressed data packets. If the network device receives a compressed data packet, a bit corresponding to the compressed data packet is set to "1". If the network device does not receive a compressed data packet, a bit corresponding to the compressed data packet is set to "0". In this way, the terminal device can quickly determine which compressed data packets are received by the network device. For another example, the status report may include a sequence number of a compressed data packet that has been received by the network device, and/or include a sequence number of a compressed data packet that has not been received by the network device. In this way, the terminal device can determine which compressed data packets are received by the network device.

With reference to the first optional implementation of the first aspect, in a second optional implementation of the first aspect, the N compressed data packets do not include the compressed data packet that has been received by the network device (the first network device or the second network device). If the network device sends the status report to the terminal device, and the status report indicates the compressed data packet that has been received by the network device, the terminal device may no longer send the compressed data packet that has been received by the network device, but only needs to send the compressed data packet that has not been received by the network device. In this way, an amount of data retransmitted by the terminal device can be reduced, and transmission overheads can be reduced.

With reference to the first aspect, the first optional implementation of the first aspect, or the second optional implementation of the first aspect, in a third optional implementation of the first aspect, a data packet with a smallest sequence number in the N compressed data packets is a data packet with a smallest sequence number in data packets that are not successfully received by the network device. After completing a cell handover or completing PDCP layer reestablishment, the terminal device may retransmit the N compressed data packets to the network device (the first network device or the second network device). The terminal device may send the N compressed data packets in ascending order of sequence numbers of the compressed data packets from a first compressed data packet that is not determined to be successfully received by the network device. For example, a first compressed data packet in the N compressed data packets (or a compressed data packet with a smallest sequence number in the N compressed data packets) may be a first compressed data packet that is not successfully received by the first network device (or a compressed data packet with a smallest sequence number in data packets that are not successfully received by the first network device). In this way, a packet loss rate of the first network device can be reduced.

With reference to any one of the first aspect, or the first optional implementation of the first aspect to the third optional implementation of the first aspect, in a fourth optional implementation of the first aspect, the method further includes: sending capability information, where the capability information indicates that continuing to use the first buffer is supported. The network device (the first network device or the second network device) can determine, based on the capability information, whether the terminal device supports continuing to use the first buffer. If the terminal device supports continuing to use the first buffer, the network device may indicate the terminal device to continue to use the first buffer. If the terminal device does not support continuing to use the first buffer, the network device may not indicate the terminal device to continue to use the first buffer or may indicate the terminal device to reset the first buffer. Alternatively, the terminal device may not send the capability information. The network device may determine, based on another factor, whether to indicate the terminal device to continue to use the first buffer, or whether the terminal device continues to use the first buffer may be specified in a protocol, or the like.

With reference to any one of the first aspect, or the first optional implementation of the first aspect to the fourth optional implementation of the first aspect, in a fifth optional implementation of the first aspect, the method further includes: receiving a handover command, where the handover command instructs to perform the cell handover or reestablish the PDCP layer, and further instructs to continue to use the first buffer. For example, the handover command includes first indication information, and the first indication information may indicate to reestablish the PDCP layer, or indicate to perform the cell handover. Optionally, the handover command may further include second indication information. The second indication information may indicate to continue to use the first buffer, or the second indication information may indicate not to reset the first buffer when the PDCP layer is reestablished. Alternatively, the second indication information may not be included in the handover command, and the first network device may send the second indication information to the terminal device by using another message. Alternatively, for example, if the protocol specifies that the first buffer continues to be used, or the protocol specifies that the first buffer is not reset when the PDCP layer is reestablished, the first network device may not send the second indication information.

With reference to any one of the first aspect, or the first optional implementation of the first aspect to the fifth optional implementation of the first aspect, in a sixth optional implementation of the first aspect, the first buffer corresponds to a first radio bearer, and the first radio bearer includes a part of or all radio bearers of the terminal device. For example, for a radio bearer on which the terminal device is configured to use a compression technology provided in this embodiment of this application, one radio bearer may correspond to one buffer, and there is a one-to-one correspondence between the radio bearer and the buffer. Alternatively, a plurality of radio bearers may correspond to one buffer. For example, space may be separately allocated to different radio bearers in the buffer, so that a quantity of buffers can be reduced.

With reference to any one of the first aspect, or the first optional implementation of the first aspect to the sixth optional implementation of the first aspect, in a seventh optional implementation of the first aspect, the sending M compressed data packets includes: sending the M compressed data packets to the first network device; and the sending N compressed data packets includes: sending the N compressed data packets to the first network device. If a cell handover process of the terminal device is a co-site handover process, to be specific, the terminal device accesses the first network device before performing the cell handover, and also accesses the first network device after performing the cell handover, the terminal device sends the M compressed data packets or the N compressed data packets to the first network device.

With reference to any one of the first aspect, or the first optional implementation of the first aspect to the sixth optional implementation of the first aspect, in an eighth optional implementation of the first aspect, the sending M compressed data packets includes: sending the M compressed data packets to the first network device, where the first network device is a network device accessed by the terminal device before the terminal device performs the cell handover; and the sending N compressed data packets includes: sending the N compressed data packets to the second network device, where the first network device is a network device accessed by the terminal device after the terminal device performs the cell handover. If a cell handover process of the terminal device is an inter-site handover process, to be specific, the terminal device accesses the first network device before performing the cell handover, and accesses the second network device after performing the cell handover, and the terminal device may send the M compressed data packets before the cell handover, and may send the N compressed data packets after the cell handover, the terminal device may send the M compressed data packets to the first network device, and send the N compressed data packets to the second network device.

According to a second aspect, a second communication method is provided. The method may be performed by a first network device, or may be performed by a chip system or another function module. The chip system or the function module can implement a function of the first network device. For example, the first network device is an access network device, for example, a base station. The method includes: receiving K compressed data packets from a terminal device, where the K compressed data packets are obtained by compressing K data packets based on a first buffer, and K is a positive integer; and reestablishing a PDCP layer without resetting a second buffer, where the second buffer is used by the first network device to decompress a data packet compressed based on the first buffer.

If the terminal device does not reset the first buffer when reestablishing the PDCP layer, correspondingly, the first network device does not reset the second buffer corresponding to the first buffer. If the terminal device needs to retransmit a data packet, the terminal device may retransmit a previously obtained compressed data packet, and does not need to compress the data packet again. This reduces a quantity of compression times of the data packet, reduces processing time of the terminal device, and improves processing efficiency. In addition, because workload of the terminal device is reduced, power consumption of the terminal device is reduced. If the first network device does not reset the second buffer, a status of the first buffer and a status of the second buffer may be consistent. Therefore, the first network device can decompress the compressed data packet from the terminal device, so that a packet loss rate of the first network device is reduced.

With reference to the second aspect, in a first optional implementation of the second aspect, sequence numbers of the K data packets and a sequence number of a data packet decompressed by the first network device are nonconsecutive. For example, sequence numbers of the K compressed data packets and a sequence number of a last data packet that has been successfully decompressed by the first network device and delivered to an upper layer are nonconsecutive, indicating that the first network device has an unreceived compressed data packet, and the unreceived compressed data packet affects decompression of the K compressed data packets by the first network device.

With reference to the second aspect or the first optional implementation of the second aspect, in a second optional implementation of the second aspect, the method further includes: sending the K compressed data packets to a second network device, where the second network device is a network device accessed by the terminal device after the terminal device performs a cell handover, and the first network device is a network device accessed by the terminal device before the terminal device performs the cell handover. For example, a cell handover process of the terminal device is an inter-site handover process. To be specific, the terminal device accesses the first network device before performing the cell handover, and accesses the second network device after performing the cell handover. In this case, because the terminal device performs the cell handover, the first network device does not need to decompress the K compressed data packets, but may forward or send the K compressed data packets to the second network device through an interface (for example, an Xn interface) between network devices, so that the second network device processes the K compressed data packets.

With reference to the second aspect, the first optional implementation of the second aspect, or the second optional implementation of the second aspect, in a third optional implementation of the second aspect, the method further includes: sending indication information to the second network device, where the indication information indicates content of the second buffer, the content of the second buffer is used to update a third buffer, the third buffer is used by the second network device to decompress the data packet compressed based on the first buffer, the second network device is the network device accessed by the terminal device after the terminal device performs the cell handover, and the first network device is the network device accessed by the terminal device before the terminal device performs the cell handover. For example, the cell handover process of the terminal device is the inter-site handover process. To be specific, the terminal device accesses the first network device before performing the cell handover, and accesses the second network device after performing the cell handover. In this case, the first network device may indicate the content of the second buffer to the second network device, and the second network device may update, based on the content of the second buffer, the third buffer maintained by the second network device, so that a status of the third buffer is consistent with that of the first buffer, and the second network device can correctly decompress the compressed data packet from the terminal device.

With reference to any one of the second aspect, or the first optional implementation of the second aspect to the third optional implementation of the second aspect, in a fourth optional implementation of the second aspect, the method further includes: sending a first message to the second network device, where the first message is used to query whether the terminal device is supported in continuing to use the first buffer, the second network device is the network device accessed by the terminal device after the terminal device performs the cell handover, and the first network device is the network device accessed by the terminal device before the terminal device performs the cell handover; and receiving, by the first network device, a second message from the second network device, where the second message indicates that the terminal device is supported in continuing to use the first buffer. For example, the cell handover process of the terminal device is the inter-site handover process. To be specific, the terminal device accesses the first network device before performing the cell handover, and accesses the second network device after performing the cell handover. In this case, the first network device may query whether the second network device supports the terminal device in continuing to use the first buffer. For example, if the second network device does not support the terminal device in continuing to use the first buffer, the first network device may configure the terminal device to reset the first buffer, so that behavior of the terminal device is consistent with behavior supported by the second network device.

With reference to the second aspect or the first optional implementation of the second aspect, in a fifth optional implementation of the second aspect, the method further includes: sending a status report to the terminal device, where the status report indicates that the first network device has received the K compressed data packets.

With reference to the fifth optional implementation of the second aspect, in a sixth optional implementation of the second aspect, the method further includes: receiving N compressed data packets from the terminal device, where the N compressed data packets are a part or all of M compressed data packets, the K compressed data packets are a part or all of the M compressed data packets, sequence numbers of the M data packets are consecutive, the M compressed data packets are obtained by compressing M data packets based on the first buffer, M is a positive integer, N is a positive integer less than or equal to M. and K is a positive integer less than or equal to M.

With reference to the sixth optional implementation of the second aspect, in a seventh optional implementation of the second aspect, the N compressed data packets do not include the K compressed data packets.

With reference to the fifth optional implementation of the second aspect, the sixth optional implementation of the second aspect, or the seventh optional implementation of the second aspect, in an eighth optional implementation of the second aspect, a data packet with a smallest sequence number in the N compressed data packets is a data packet with a smallest sequence number in data packets that are not successfully received by the first network device.

With reference to any one of the second aspect, or the first optional implementation of the second aspect to the eighth optional implementation of the second aspect, in a ninth optional implementation of the second aspect, the method further includes: receiving capability information from the terminal device, where the capability information indicates that the terminal device supports continuing to use the first buffer.

With reference to any one of the second aspect, or the first optional implementation of the second aspect to the ninth optional implementation of the second aspect, in a tenth optional implementation of the second aspect, the method further includes: sending a handover command to the terminal device, where the handover command instructs to perform the cell handover or reestablish a PDCP layer, and further instructs to continue to use the first buffer.

With reference to any one of the second aspect, or the first optional implementation of the second aspect to the tenth optional implementation of the second aspect, in an eleventh optional implementation of the second aspect, the first buffer corresponds to a first radio bearer, and the first radio bearer includes a part of or all radio bearers of the terminal device.

For technical effects brought by the second aspect or some optional implementations, refer to descriptions of technical effects of the first aspect or the corresponding implementations.

According to a third aspect, a third communication method is provided. The method may be performed by a second network device, or may be performed by a chip system or another function module. The chip system or the function module can implement a function of the second network device. For example, the second network device is an access network device, for example, a base station. The method includes: receiving K compressed data packets from a first network device, where the K compressed data packets are obtained by compressing K data packets based on a first buffer, the second network device is a network device accessed by a terminal device after the terminal device performs a cell handover, and the first network device is a network device accessed by the terminal device before the terminal device performs the cell handover; receiving indication information from the first network device, where the indication information indicates content of a second buffer, and the second buffer is used by the first network device to decompress a data packet compressed based on the first buffer; and updating a third buffer based on the content of the second buffer, where the third buffer is used by the second network device to decompress the data packet compressed based on the first buffer.

With reference to the third aspect, in a first optional implementation of the third aspect, sequence numbers of the K data packets and a sequence number of a data packet that has been received by the second network device are non-consecutive.

With reference to the third aspect or the first optional implementation of the third aspect, in a second optional implementation of the third aspect, the method further includes: receiving N compressed data packets from the terminal device, where the N compressed data packets are a part or all of M compressed data packets, the K compressed data packets are a part or all of the M compressed data packets, sequence numbers of the M data packets are consecutive, the M compressed data packets are obtained by compressing M data packets based on the first buffer, M is a positive integer, N is a positive integer less than or equal to M. and K is a positive integer less than or equal to M.

With reference to the third aspect, the first optional implementation of the third aspect, or the second optional implementation of the third aspect, in a third optional implementation of the third aspect, the method further includes: receiving a first message from the first network device, where the first message is used to query whether the terminal device is supported in continuing to use the first buffer; and sending a second message to the first network device, where the second message indicates that the terminal device is supported in continuing to use the first buffer.

With reference to any one of the third aspect, or the first optional implementation of the third aspect to the third optional implementation of the third aspect, in a fourth optional implementation of the third aspect, the method further includes: sending a status report to the terminal device, where the status report indicates that the second network device has received the K compressed data packets.

With reference to the fourth optional implementation of the third aspect, in a fifth optional implementation of the third aspect, the N compressed data packets do not include the K compressed data packets.

With reference to any one of the third aspect, or the first optional implementation of the third aspect to the fifth optional implementation of the third aspect, in a sixth optional implementation of the third aspect, a data packet with a smallest sequence number in the N compressed data packets is a data packet with a smallest sequence number in data packets that are not successfully received by the second network device.

With reference to any one of the third aspect, or the first optional implementation of the third aspect to the sixth optional implementation of the third aspect, in a seventh optional implementation of the third aspect, the first buffer corresponds to a first radio bearer, and the first radio bearer includes a part of or all radio bearers of the terminal device.

For technical effects brought by the third aspect or the optional implementations, refer to descriptions of technical effects of the first aspect or the corresponding implementations, and/or refer to descriptions of technical effects of the second aspect or the corresponding implementations.

The method according to any one or more aspects of the first aspect, the second aspect, or the third aspect relates to an uplink compression process.

According to a fourth aspect, a fourth communication method is provided. The method may be performed by a first network device, or may be performed by a chip system or another function module. The chip system or the function module can implement a function of the first network device. For example, the first network device is an access network device, for example, a base station. The method includes: sending M compressed data packets to a terminal device, where the M compressed data packets are obtained by compressing M data packets based on a first buffer, and M is a positive integer; and reestablishing a PDCP layer without resetting the first buffer.

In this embodiment of this application, when reestablishing the PDCP layer, the first network device does not reset the first buffer. In this case, if the first network device needs to retransmit a data packet, the first network device may retransmit a previously obtained compressed data packet, and does not need to compress the data packet again. This reduces a quantity of compression times of the data packet, reduces processing time of the first network device, and improves processing efficiency. In addition, because workload of the first network device is reduced, power consumption of the first network device is reduced.

With reference to the fourth aspect, in a first optional implementation of the fourth aspect, the method further includes: sending indication information to a second network device, where the indication information indicates content of the first buffer, the content of the first buffer is used to update a second buffer, the second buffer is used by the second network device to compress the data packet, the first network device is a network device accessed by the terminal device before the terminal device performs a cell handover, and the second network device is a network device accessed by the terminal device after the terminal device performs the cell handover.

With reference to the fourth aspect or the first optional implementation of the fourth aspect, in a second optional implementation of the fourth aspect, the method further includes, sending a first message to the second network device, where the first message is used to query whether the terminal device is supported in continuing to use a third buffer, the first network device is the network device accessed by the terminal device before the terminal device performs the cell handover, and the second network device is the network device accessed by the terminal device after the terminal device performs the cell handover; and receiving a second message from the second network device, where the second message indicates that the terminal device is supported in continuing to use the third buffer.

With reference to the fourth aspect, in a third optional implementation of the fourth aspect, the method further includes: receiving a status report from the terminal device, where the status report indicates a compressed data packet that has been received by the terminal device.

With reference to the third optional implementation of the fourth aspect, in a fourth optional implementation of the fourth aspect, the method further includes: sending N compressed data packets to the terminal device, where the N compressed data packets are a part or all of the M compressed data packets, and N is a positive integer less than or equal to M.

With reference to the fourth optional implementation of the fourth aspect, in a fifth optional implementation of the fourth aspect, the N compressed data packets do not include the compressed data packet that has been received by the terminal device.

With reference to the third optional implementation of the fourth aspect, the fourth optional implementation of the fourth aspect, or the fifth optional implementation of the fourth aspect, in a sixth optional implementation of the fourth aspect, a data packet with a smallest sequence number in the N compressed data packets is a data packet with a smallest sequence number in data packets that are not successfully received by the terminal device.

With reference to any one of the fourth aspect, or the first optional implementation of the fourth aspect to the sixth optional implementation of the fourth aspect, in a seventh optional implementation of the fourth aspect, the method further includes: receiving capability information from the terminal device, where the capability information indicates that the terminal device supports continuing to use the third buffer, the third buffer is used by the terminal device to decompress a data packet compressed based on the first buffer or the second buffer, the second buffer is used by the second network device to compress the data packet, and the second network device is the network device accessed by the terminal device after the terminal device performs the cell handover.

With reference to any one of the fourth aspect, or the first optional implementation of the fourth aspect to the seventh optional implementation of the fourth aspect, in an eighth optional implementation of the fourth aspect, the method further includes, sending a handover command to the terminal device, where the handover command instructs to perform the cell handover or reestablish a PDCP layer, and further instructs the terminal device to continue to use the third buffer, the third buffer is used by the terminal device to decompress the data packet compressed based on the first buffer or the second buffer, the second buffer is used by the second network device to compress the data packet, and the second network device is the network device accessed by the terminal device after the terminal device performs the cell handover.

For technical effects brought by the fourth aspect or the optional implementations, refer to descriptions of technical effects of the first aspect or the corresponding implementations, and/or refer to descriptions of technical effects of the second aspect or the corresponding implementations, and/or refer to descriptions of technical effects of the third aspect or the corresponding implementations.

According to a fifth aspect, a fifth communication method is provided. The method may be performed by a second network device, or may be performed by a chip system or another function module. The chip system or the function module can implement a function of the second network device. For example, the second network device is an access network device, for example, a base station. The method includes: receiving indication information from a first network device, where the indication information indicates content of a first buffer, the first buffer is used by the first network device to compress a data packet, the second network device is a network device accessed by a terminal device after the terminal device performs a cell handover, and the first network device is a network device accessed by the terminal device before the terminal device performs the cell handover; and updating a second buffer based on the content of the first buffer, where the second buffer is used by the second network device to compress the data packet.

With reference to the fifth aspect, in a first optional implementation of the fifth aspect, the method further includes: receiving a first message from the first network device, where the first message is used to query whether the terminal device is supported in continuing to use a third buffer; and sending a second message to the first network device, where the second message indicates that the terminal device is supported in continuing to use the third buffer.

With reference to the fifth aspect or the first optional implementation of the fifth aspect, in a second optional implementation of the fifth aspect, the method further includes: receiving a status report from the terminal device, where the status report indicates a compressed data packet that has been received by the terminal device.

With reference to the second optional implementation of the fifth aspect, in a third optional implementation of the fifth aspect, the method further includes: compressing a data packet based on the updated second buffer to obtain N compressed data packets; and sending the N compressed data packets to the terminal device.

With reference to the third optional implementation of the fifth aspect, in a fourth optional implementation of the fifth aspect, the N compressed data packets do not include the compressed data packet that has been received by the terminal device.

With reference to the third optional implementation of the fifth aspect or the fourth optional implementation of the fifth aspect, in a fifth optional implementation of the fifth aspect, a data packet with a smallest sequence number in the N compressed data packets is a data packet with a smallest sequence number in data packets that are not successfully received by the terminal device.

For technical effects brought by the fifth aspect or the optional implementations, refer to descriptions of technical effects of the first aspect or the corresponding implementations, and/or refer to descriptions of technical effects of the second aspect or the corresponding implementations, and/or refer to descriptions of technical effects of the third aspect or the corresponding implementations.

According to a sixth aspect, a sixth communication method is provided. The method may be performed by a terminal device, or may be performed by a chip system or another function module. The chip system or the function module can implement a function of the terminal device. The method includes: receiving K compressed data packets, where the K compressed data packets are obtained by compressing K data packets based on a first buffer; reestablishing a PDCP layer without resetting a third buffer; receiving N compressed data packets, where the N compressed data packets are obtained by compressing N data packets based on a second buffer, and both K and N are positive integers; and decompressing the K compressed data packets and the N compressed data packets based on the third buffer, or decompressing the N compressed data packets based on the third buffer.

With reference to the sixth aspect, in a first optional implementation of the sixth aspect, the receiving K compressed data packets includes: receiving the K compressed data packets from a first network device; and the receiving N compressed data packets includes: receiving the N compressed data packets from the first network device.

With reference to the first optional implementation of the sixth aspect, in a second optional implementation of the sixth aspect, the first buffer and the second buffer are a same buffer, and the first buffer is maintained by the first network device.

With reference to the sixth aspect, in a third optional implementation of the sixth aspect, the receiving K compressed data packets includes: receiving the K compressed data packets from a first network device; and the receiving N compressed data packets includes: receiving the N compressed data packets from a second network device, where the second network device is a network device accessed by the terminal device after the terminal device performs a cell handover, and the first network device is a network device accessed by the terminal device before the terminal device performs the cell handover.

With reference to the third optional implementation of the sixth aspect, in a fourth optional implementation of the sixth aspect, the first buffer is maintained by the first network device, and the second buffer is maintained by the second network device.

With reference to the sixth aspect or the first optional implementation of the sixth aspect to the fourth optional implementation of the sixth aspect, in a fifth optional implementation of the sixth aspect, sequence numbers of the K data packets and a sequence number of a data packet decompressed by the terminal device are nonconsecutive.

With reference to the sixth aspect or the first optional implementation of the sixth aspect to the fifth optional implementation of the sixth aspect, in a sixth optional implementation of the sixth aspect, a data packet with a smallest sequence number in the N compressed data packets is a data packet with a smallest sequence number in data packets that are not successfully received by the terminal device.

With reference to the sixth aspect or the first optional implementation of the sixth aspect to the sixth optional implementation of the sixth aspect, in a seventh optional implementation of the sixth aspect, the method further includes: sending a status report, where the status report indicates that the terminal device has received the K compressed data packets.

With reference to the seventh optional implementation of the sixth aspect, in an eighth optional implementation of the sixth aspect, the N compressed data packets do not include the K compressed data packets.

With reference to the sixth aspect, or the first optional implementation of the sixth aspect to the eighth optional implementation of the sixth aspect, in a ninth optional implementation of the sixth aspect, the method further includes; receiving a handover command, where the handover command instructs to perform the cell handover or reestablish the PDCP layer, and further instructs the terminal device to continue to use the third buffer.

With reference to the sixth aspect, or the first optional implementation of the sixth aspect to the ninth optional implementation of the sixth aspect, in a tenth optional implementation of the sixth aspect, the method further includes: sending capability information, where the capability information indicates that the terminal device supports continuing to use the third buffer.

For technical effects brought by the sixth aspect or the optional implementations, refer to descriptions of technical effects of the first aspect or the corresponding implementations, and/or refer to descriptions of technical effects of the second aspect or the corresponding implementations, and/or refer to descriptions of technical effects of the third aspect or the corresponding implementations.

The method according to any one or more of the fourth aspect, the fifth aspect, or the sixth aspect relates to a downlink compression process.

According to a seventh aspect, a seventh communication method is provided. The method may be performed by a terminal device, or may be performed by a chip system or another function module. The chip system or the function module can implement a function of the terminal device. The method includes: receiving a handover command, where the handover command includes first indication information and second indication information, the first indication information indicates to reestablish a PDCP layer or perform a cell handover, the second indication information indicates the terminal device to continue to use a first buffer, and the first buffer is used by the terminal device to compress a data packet; and reestablishing the PDCP layer without resetting the first buffer.

With reference to the seventh aspect, in a first optional implementation of the seventh aspect, the method further includes: receiving a status report, where the status report indicates a compressed data packet that has been received by a network device.

With reference to the first optional implementation of the seventh aspect, in a second optional implementation of the seventh aspect, the method further includes: sending N compressed data packets in ascending order of sequence numbers of the compressed data packets from a first compressed data packet that is not determined to be successfully received, where N is a positive integer.

With reference to the second optional implementation of the seventh aspect, in a third optional implementation of the seventh aspect, the sending N compressed data packets in ascending order of sequence numbers of the compressed data packets from a first compressed data packet that is not determined to be successfully received includes: performing integrity protection and encryption processing on the N compressed data packets; and sending processed N compressed data packets.

With reference to any one of the seventh aspect, or the first optional implementation of the seventh aspect to the third optional implementation of the seventh aspect, in a fourth optional implementation of the seventh aspect, the method further includes: sending capability information, where the capability information indicates that continuing to use the first buffer is supported.

With reference to any one of the seventh aspect, or the first optional implementation of the seventh aspect to the fourth optional implementation of the seventh aspect, in a fifth optional implementation of the seventh aspect, the first buffer corresponds to a first radio bearer, and the first radio bearer includes a part of or all radio bearers of the terminal device.

For technical effects brought by the seventh aspect or the optional implementations, refer to descriptions of technical effects of the first aspect or the corresponding implementations, and/or refer to descriptions of technical effects of the second aspect or the corresponding implementations, and/or refer to descriptions of technical effects of the third aspect or the corresponding implementations.

According to an eighth aspect, an eighth communication method is provided. The method may be performed by a first network device, or may be performed by a chip system or another function module. The chip system or the function module can implement a function of the first network device. For example, the first network device is an access network device, for example, a base station. The method includes: sending a handover command to a terminal device, where the handover command includes first indication information and second indication information, the first indication information indicates to reestablish a PDCP layer or perform a cell handover, the second indication information indicates to continue to use a first buffer, and the first buffer is used by the terminal device to compress a data packet; and reestablishing the PDCP layer without resetting a second buffer, where the second buffer is used by the first network device to decompress the data packet compressed based on the first buffer.

With reference to the eighth aspect, in a first optional implementation of the eighth aspect, the method further includes: sending K compressed data packets to a second network device, where the K compressed data packets are from the terminal device, the second network device is a network device accessed by the terminal device after the terminal device performs the cell handover, and the first network device is a network device accessed by the terminal device before the terminal device performs the cell handover.

With reference to the eighth aspect or the first optional implementation of the eighth aspect, in a second optional implementation of the eighth aspect, the method further includes: sending indication information to the second network device, where the indication information indicates content of the second buffer, the content of the second buffer is used to update a third buffer, the third buffer is used by the second network device to decompress the data packet compressed based on the first buffer, the second network device is the network device accessed by the terminal device after the terminal device performs the cell handover, and the first network device is the network device accessed by the terminal device before the terminal device performs the cell handover.

With reference to the eighth aspect, the first optional implementation of the eighth aspect, or the second optional implementation of the eighth aspect, in a third optional implementation of the eighth aspect, the method further includes: sending a first message to the second network device, where the first message is used to query whether the terminal device is supported in continuing to use the first buffer, the second network device is the network device accessed by the terminal device after the terminal device performs the cell handover, and the first network device is the network device accessed by the terminal device before the terminal device performs the cell handover; and receiving, by the first network device, a second message from the second network device, where the second message indicates that the terminal device is supported in continuing to use the first buffer.

With reference to the eighth aspect, in a fourth optional implementation of the eighth aspect, the method further includes: sending a status report to the terminal device, where the status report indicates a compressed data packet that has been received by the first network device.

With reference to the fourth optional implementation of the eighth aspect, in a fifth optional implementation of the eighth aspect, the method further includes: receiving N compressed data packets from the terminal device, where a data packet with a smallest sequence number in the N compressed data packets is a data packet with a smallest sequence number in data packets that are not successfully received by the first network device.

With reference to the fifth optional implementation of the eighth aspect, in a sixth optional implementation of the eighth aspect, the N compressed data packets do not include the compressed data packet that has been received by the first network device.

With reference to the eighth aspect, the first optional implementation of the eighth aspect, or the sixth optional implementation of the eighth aspect, in a seventh optional implementation of the eighth aspect, the method further includes: receiving capability information from the terminal device, where the capability information indicates that the terminal device supports continuing to use the first buffer.

With reference to the eighth aspect, the first optional implementation of the eighth aspect, or the sixth optional implementation of the seventh aspect, in an eighth optional implementation of the eighth aspect, the first buffer corresponds to a first radio bearer, and the first radio bearer includes a part of or all radio bearers of the terminal device.

For technical effects brought by the eighth aspect or the optional implementations, refer to descriptions of technical effects of the first aspect or the corresponding implementations, and/or refer to descriptions of technical effects of the second aspect or the corresponding implementations, and/or refer to descriptions of technical effects of the third aspect or the corresponding implementations.

The method according to the seventh aspect and/or the eighth aspect relates to an uplink compression process.

According to a ninth aspect, a ninth communication method is provided. The method may be performed by a first network device, or may be performed by a chip system or another function module. The chip system or the function module can implement a function of the first network device. For example, the first network device is an access network device, for example, a base station. The method includes: sending a handover command to a terminal device, where the handover command includes first indication information and second indication information, the first indication information indicates to reestablish a PDCP layer or perform a cell handover, the second indication information indicates to continue to use a third buffer, and the third buffer is used by the terminal device to decompress a data packet compressed based on a first buffer or a second buffer; and reestablishing the PDCP layer without resetting the first buffer, where the first buffer is used by the first network device to decompress the data packet.

With reference to the ninth aspect, in a first optional implementation of the ninth aspect, the method further includes: sending indication information to a second network device, where the indication information indicates content of the first buffer, the content of the first buffer is used to update a second buffer, the second buffer is used by the second network device to compress the data packet, the first network device is a network device accessed by the terminal device before the terminal device performs the cell handover, and the second network device is a network device accessed by the terminal device after the terminal device performs the cell handover.

With reference to the ninth aspect or the first optional implementation of the ninth aspect, in a second optional implementation of the ninth aspect, the method further includes: sending a first message to the second network device, where the first message is used to query whether the terminal device is supported in continuing to use the third buffer, the first network device is the network device accessed by the terminal device before the terminal device performs the cell handover, and the second network device is the network device accessed by the terminal device after the terminal device performs the cell handover; and receiving a second message from the second network device, where the second message indicates that the terminal device is supported in continuing to use the third buffer.

With reference to the ninth aspect, in a third optional implementation of the ninth aspect, the method further includes: receiving a status report from the terminal device, where the status report indicates a compressed data packet that has been received by the terminal device.

With reference to the third optional implementation of the ninth aspect, in a fourth optional implementation of the ninth aspect, the method further includes: sending N compressed data packets to the terminal device in ascending order of sequence numbers of the compressed data packets from a first compressed data packet that is not determined to be successfully received, where N is a positive integer.

With reference to the fourth optional implementation of the ninth aspect, in a fifth optional implementation of the ninth aspect, the sending N compressed data packets to the terminal device in ascending order of sequence numbers of the compressed data packets from a first compressed data packet that is not determined to be successfully received includes: performing integrity protection and encryption processing on the N compressed data packets; and sending processed N compressed data packets to the terminal device.

With reference to the fourth optional implementation of the ninth aspect or the fifth optional implementation of the ninth aspect, in a sixth optional implementation of the ninth aspect, a data packet with a smallest sequence number in the N compressed data packets is a data packet with a smallest sequence number in data packets that are not successfully received by the terminal device.

With reference to the fourth optional implementation of the ninth aspect, the fifth optional implementation of the ninth aspect, or the sixth optional implementation of the ninth aspect, in a seventh optional implementation of the ninth aspect, the N compressed data packets do not include the compressed data packet that has been received by the terminal device.

With reference to any one of the ninth aspect, or the first optional implementation of the ninth aspect to the seventh optional implementation of the ninth aspect, in an eighth optional implementation of the ninth aspect, the method further includes: receiving capability information from the terminal device, where the capability information indicates that the terminal device supports continuing to use the third buffer.

For technical effects brought by the ninth aspect or the optional implementations, refer to descriptions of technical effects of the first aspect or the corresponding implementations, and/or refer to descriptions of technical effects of the second aspect or the corresponding implementations, and/or refer to descriptions of technical effects of the third aspect or the corresponding implementations.

The method according to the ninth aspect relates to a downlink compression process.

According to a tenth aspect, a communication apparatus is provided. The communication apparatus may be the terminal device according to any one of the first to ninth aspects. The communication apparatus has functions of the terminal device. The terminal device is, for example, a base station, or a baseband apparatus in a base station. In an optional implementation, the communication apparatus includes a baseband apparatus and a radio frequency apparatus. In another optional implementation, the communication apparatus includes a processing unit (sometimes also referred to as a processing module) and a transceiver unit (sometimes also referred to as a transceiver module). The transceiver unit can implement a sending function and a receiving function. When the transceiver unit implements the sending function, the transceiver unit may be referred to as a sending unit (sometimes also referred to as a sending module), and when the transceiver unit implements the receiving function, the transceiver unit may be referred to as a receiving unit (sometimes also referred to as a receiving module). The sending unit and the receiving unit may be a same functional module. The functional module is referred to as a transceiver unit. The functional module can implement the sending function and the receiving function. Alternatively, the sending unit and the receiving unit may be different functional modules, and the transceiver unit is a general name for these functional modules.

The transceiver unit (or the sending unit) is configured to send M compressed data packets, where the M compressed data packets are obtained by compressing M data packets based on a first buffer, and M is a positive integer.

The processing unit is configured to reestablish a PDCP layer without resetting the first buffer.

The transceiver unit (or the sending unit) is further configured to send N compressed data packets, where the N compressed data packets are a part or all of the M compressed data packets, and N is a positive integer less than or equal to M.

Alternatively, the transceiver unit (or the receiving unit) is configured to receive K compressed data packets, where the K compressed data packets are obtained by compressing K data packets based on a first buffer.

The processing unit is configured to reestablish a PDCP layer without resetting a third buffer.

The transceiver unit (or the receiving unit) is further configured to receive N compressed data packets, where the N compressed data packets are obtained by compressing N data packets based on a second buffer, and both K and N are positive integers.

The processing unit is further configured to decompress the K compressed data packets and the N compressed data packets based on the third buffer, or decompress the N compressed data packets based on the third buffer.

Alternatively, the transceiver unit (or the receiving unit) is configured to receive a handover command, where the handover command includes first indication information and second indication information, the first indication information indicates to reestablish a PDCP layer or perform a cell handover, the second indication information indicates the terminal device to continue to use a first buffer, and the first buffer is used by the terminal device to compress a data packet.

The processing unit is configured to reestablish the PDCP layer without resetting the first buffer.

In an optional implementation, the communication apparatus further includes a storage unit, and the processing unit is configured to: couple to the storage unit, and execute a program or instructions in the storage unit, to enable the communication apparatus to perform a function of the terminal device according to any one of the first to ninth aspects.

According to an eleventh aspect, a communication apparatus is provided. The communication apparatus may be the first network device according to any one of the first to ninth aspects. The communication apparatus has functions of the first network device. The first network device is, for example, a base station, or a baseband apparatus in a base station. In an optional implementation, the communication apparatus includes a baseband apparatus and a radio frequency apparatus. In another optional implementation, the communication apparatus includes a processing unit (sometimes also referred to as a processing module) and a transceiver unit (sometimes also referred to as a transceiver module). For an implementation of the transceiver unit, refer to the description of the fourth aspect.

The transceiver unit (or a receiving unit) is configured to receive K compressed data packets from a terminal device, where the K compressed data packets are obtained by compressing K data packets based on a first buffer, and K is a positive integer.

The processing unit is configured to reestablish a PDCP layer without resetting a second buffer, where the second buffer is used by the first network device to decompress a data packet compressed based on the first buffer.

Alternatively, the transceiver unit (or the receiving unit) is configured to receive K compressed data packets from the first network device, where the K compressed data packets are obtained by compressing K data packets based on a first buffer, a second network device is a network device accessed by a terminal device after the terminal device performs a cell handover, and the first network device is a network device accessed by the terminal device before the terminal device performs the cell handover.

The transceiver unit (or the receiving unit) is further configured to receive indication information from the first network device, where the indication information indicates content of a second buffer, and the second buffer is used by the first network device to decompress a data packet compressed based on the first buffer.

The processing unit is configured to update a third buffer based on the content of the second buffer, where the third buffer is used by the second network device to decompress the data packet compressed based on the first buffer.

Alternatively, the transceiver unit (or a sending unit) is configured to send M compressed data packets to a terminal device, where the M compressed data packets are obtained by compressing M data packets based on a first buffer, and M is a positive integer.

The processing unit is configured to reestablish a PDCP layer without resetting the first buffer.

Alternatively, the transceiver unit (or the receiving unit) is configured to receive indication information from the first network device, where the indication information indicates content of a first buffer, the first buffer is used by the first network device to compress a data packet, a second network device is a network device accessed by a terminal device after the terminal device performs a cell handover, and the first network device is a network device accessed by the terminal device before the terminal device performs the cell handover.

The processing unit is configured to update a second buffer based on the content of the first buffer, where the second buffer is used by the second network device to compress the data packet.

Alternatively.

the transceiver unit (or the sending unit) is configured to send a handover command to a terminal device, where the handover command includes first indication information and second indication information, the first indication information indicates to reestablish a PDCP layer or perform a cell handover, the second indication information indicates to continue to use a first buffer, and the first buffer is used by the terminal device to compress a data packet.

The processing unit is configured to reestablish a PDCP layer without resetting a second buffer, where the second buffer is used by the first network device to decompress the data packet compressed based on the first buffer.

Alternatively, the transceiver unit (or the sending unit) is configured to send a handover command to a terminal device, where the handover command includes first indication information and second indication information, the first indication information indicates to reestablish a PDCP layer or perform a cell handover, the second indication information indicates to continue to use a third buffer, and the third buffer is used by the terminal device to decompress a data packet compressed based on a first buffer or a second buffer.

The processing unit is configured to reestablish a PDCP layer without resetting the first buffer, where the first buffer is used by the first network device to compress a data packet.

In an optional implementation, the communication apparatus further includes a storage unit, and the processing unit is configured to: couple to the storage unit, and execute a program or instructions in the storage unit, to enable the communication apparatus to perform a function of the first network device or the second network device according to any one of the first to ninth aspects.

According to a twelfth aspect, a computer-readable storage medium is provided. The computer-readable storage medium is configured to store a computer program or instructions. When the computer-readable storage medium is run, the method performed by the terminal device, the first network device, or the second network device in the foregoing aspects is implemented.

According to a thirteenth aspect, a computer program product including instructions is provided. When the computer program product runs on a computer, the methods in the foregoing aspects are implemented.

DESCRIPTION OF EMBODIMENTS

Figure 1:
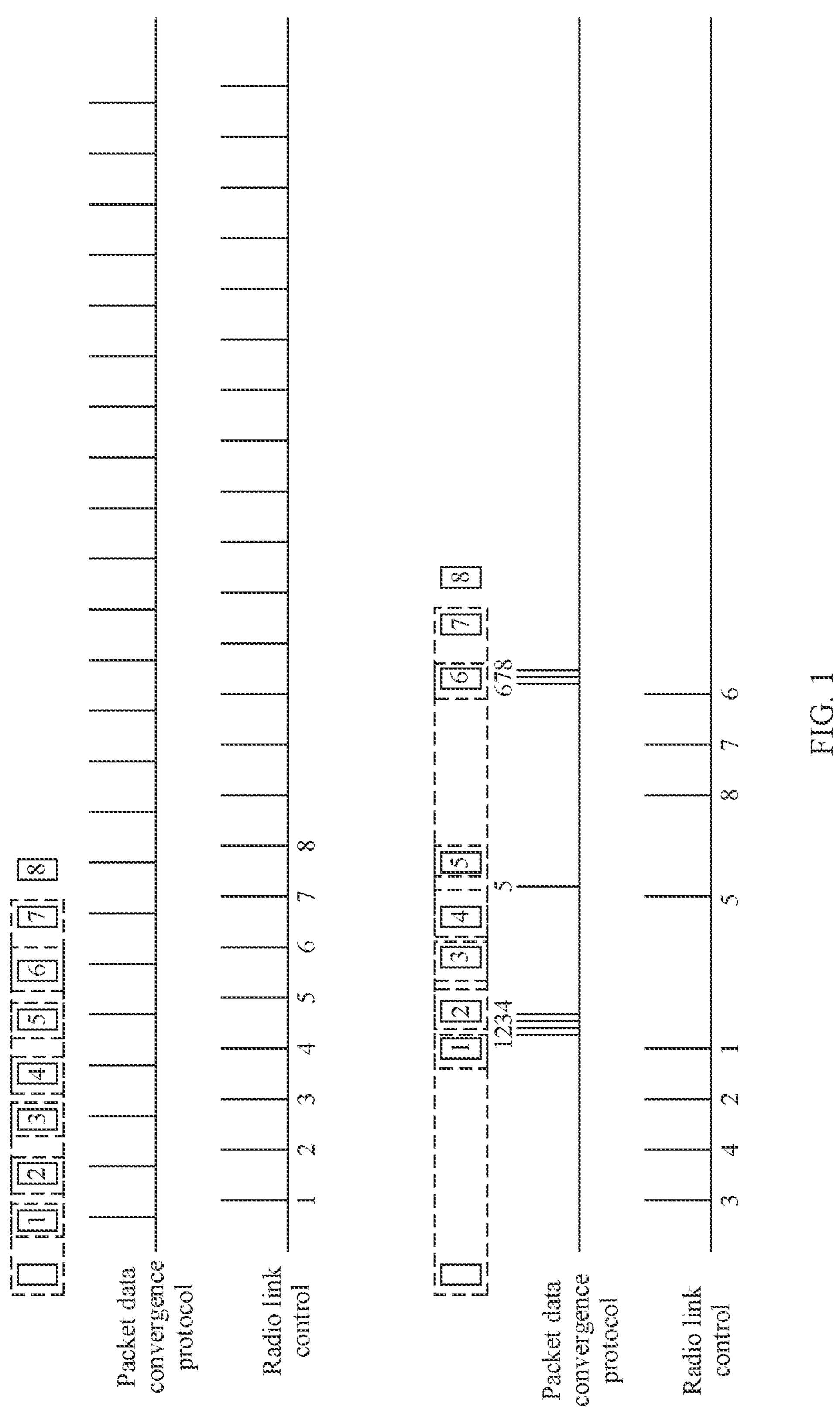
FIG. 1 is a schematic diagram of a data packet compression and decompression process in an LTE system.

To make the objectives, technical solutions, and advantages of embodiments of this application clearer, the following further describes embodiments of this application in detail with reference to the accompanying drawings.

In embodiments of this application, a terminal device is a device with a wireless transceiver function, and may be a fixed device, a mobile device, a handheld device (for example, a mobile phone), a wearable device, a vehicle-mounted device, or a wireless apparatus built in the foregoing device (for example, a communication module, a modem, or a circuit system). The terminal device is configured to connect people, things, machines, and the like, and may be widely used in various scenarios, for example, the terminal device may be used in, including but not limited to, the following scenarios: cellular communication, device-to-device (device-to-device, D2D) communication, vehicle to everything (vehicle to everything, V2X), machine-to-machine/machine-type communications (machine-to-machine/machine-type communications, M2M/MTC), internet of things (internet of things, IoT), virtual reality (virtual reality, VR), augmented reality (augmented reality, AR), industrial control (industrial control), self driving (self driving), remote medical (remote medical), smart grid (smart grid), smart furniture, smart office, smart wearables, smart transportation, smart city (smart city), uncrewed aerial vehicles, and robots. The terminal device may be sometimes referred to as user equipment (user equipment, UE), a terminal, an access station, a UE station, a remote station, a wireless communication device, a user apparatus, or the like.

A network device in embodiments of this application includes, for example, an access network device and/or a core network device. The access network device is a device having a wireless transceiver function, and is configured to communicate with the terminal device. The access network device includes but is not limited to a base transceiver station (BTS), a NodeB (NodeB), an evolved NodeB (eNodeB/eNB, or gNodeB/gNB), a transmission reception point (transmission reception point, TRP), a base station subsequently evolved from the 3rd generation partnership project (3rd generation partnership project, 3GPP), an access node in a wireless fidelity (wireless fidelity, Wi-Fi) system, a wireless relay node, a wireless backhaul node, and the like in the foregoing communication system. The base station may be a macro base station, a micro base station, a picocell base station, a small cell, a relay station, or the like. A plurality of base stations may support the foregoing networks using a same access technology, or may support the foregoing networks using different access technologies. The base station may include one or more co-site or non-co-site transmission reception points. The network device may alternatively be a radio controller, a central unit (centralized unit, CU), and/or a distributed unit (distributed unit, DU) in a cloud radio access network (cloud radio access network, CRAN) scenario. The network device may alternatively be a server, a wearable device, a vehicle-mounted device, or the like. For example, a network device in a vehicle to everything (vehicle to everything, V2X) technology may be a road side unit (road side unit, RSU). The following provides descriptions by using an example in which the access network device is a base station. A plurality of network devices in the communication system may be base stations of a same type, or may be base stations of different types. The base station may communicate with a terminal device, or may communicate with a terminal device via a relay station. The terminal device may communicate with a plurality of base stations in different access technologies. The core network device is configured to implement functions such as mobility management, data processing, session management, and policy and charging. Names of devices that implement core network functions in systems of different access technologies may be different. This is not limited in embodiments of this application. A 5G system is used as an example. The core network device includes an access and mobility management function (access and mobility management function, AMF), a session management function (session management function, SMF), a user plane function (user plane function, UPF), or the like.

In embodiments of this application, a communication apparatus configured to implement a network device function may be a network device, or may be an apparatus, for example, a circuit system, that can support the network device to implement the function. The apparatus may be installed in the network device. In the technical solutions provided in embodiments of this application, the technical solutions provided in embodiments of this application are described by using an example in which the apparatus configured to implement the network device function is the network device.

In embodiments of this application, unless otherwise specified, a quantity of nouns represents "a singular noun or a plural noun", namely, "one or more". "At least one" means one or more, and "a plurality of" means two or more. "And/Or" describes an association relationship between associated objects, and indicates that three relationships may exist. For example, A and/or B may represent the following cases: Only A exists, both A and B exist, and only B exists, where A and B may be in a singular form or a plural form. The character "/" generally indicates an "or" relationship between the associated objects. For example, A/B indicates A or B. At least one of the following items (pieces) or a similar expression thereof refers to any combination of these items, including any combination of singular items (pieces) or plural items (pieces). For example, at least one item (piece) of a, b, or c indicate: a, b, c, a and b, a and c, b and c, or a, b, and c, where a, b, and c may be singular or plural.

Ordinal numbers such as “first” and “second” mentioned in embodiments of this application are used to distinguish between a plurality of objects, but are not used to limit sizes, content, sequences, time sequences, application scenarios, priorities, or importance degrees of the plurality of objects. For example, a first buffer and a second buffer may be a same buffer, or may be different buffers. In addition, such names do not indicate that content, priorities, application scenarios, or importance degrees of the two buffers are different.

FIG. 1 shows a data packet compression and decompression process in an LTE system. PDCP and RLC in upper two rows in FIG. 1 represent a PDCP layer and an RLC layer of a transmitting end. For example, a size of a buffer is two data packets. Each dashed-line box represents content included in the buffer. In addition, a dashed-line box including “/” represents preset information included in the buffer. Each data packet is compressed based on content currently included in the buffer. PDCP and RLC in lower two rows in FIG. 1 represent a PDCP layer and an RLC layer of a receiving end. In AM mode, the RLC layer supports a data retransmission mechanism. Therefore, although the transmitting end sends compressed data packets in order, the receiving end may receive compressed data packets out of order. In the LTE system, the RLC layer of the receiving end sorts the received compressed data packets, and then delivers the sorted compressed data packets to the PDCP layer. For example, in FIG. 1, the RLC layer of the receiving end receives a compressed data packet 1, a compressed data packet 2, a compressed data packet 3, and a compressed data packet 4 in an order of the compressed data packet 3, the compressed data packet 4, the compressed data packet 2, and the compressed data packet 1. After receiving the compressed data packet 1, the RLC layer sorts the four compressed data packets, and then delivers the four compressed data packets to the PDCP layer in a normal order. After receiving the four compressed data packets, the PDCP layer sequentially decompresses the four compressed data packets by using a UDC protocol stack. Then, the receiving end receives a compressed data packet 5, the RLC layer of the receiving end delivers the compressed data packet 5 to the PDCP layer, and the PDCP layer decompresses the compressed data packet 5. Then, the receiving end receives a compressed data packet 6, a compressed data packet 7, and a compressed data packet 8, and the receiving end receives the three compressed data packets in an order of the compressed data packet 8, the compressed data packet 7, and the compressed data packet 6. In this case, after receiving the compressed data packet 6, the RLC layer of the receiving end sorts the three compressed data packets, and then delivers the sorted three compressed data packets to the PDCP layer. After receiving the three compressed data packets, the PDCP layer sequentially decompresses the three compressed data packets by using the UDC protocol stack. For example, the PDCP layer decompresses the compressed data packet 1 based on preset information included in a compression buffer, the PDCP layer decompresses the compressed data packet 2 based on the preset information included in the compression buffer and information obtained after the compressed data packet 1 is decompressed, the PDCP layer decompresses the compressed data packet 3 based on the information obtained after the compressed data packet 1 is decompressed and information obtained after the compressed data packet 2 is decompressed (because the buffer can hold content of two data packets is used as an example, the preset information is considered to be squeezed out of the buffer), and so on. A sequence number of a data packet (or a sequence number of a compressed data packet) in FIG. 1 is a sequence number (sequence number, SN) of the PDCP layer, or the sequence number may alternatively be understood as a count (count) value of the PDCP layer of the data packet.

Generally, the PDCP layer of the receiving end receives compressed data packets in sequence, to ensure that a buffer of the receiving end is aligned with a buffer of the transmitting end, thereby implementing sequential decompression.

In the LTE system, when a cell handover occurs on a terminal device, a radio link control (radio link control, RLC) layer of a base station is reestablished. If out-of-order compressed data packets have been received at the RLC layer, or a data packet has not been received at the RLC layer, the RLC layer no longer waits to receive an unreceived compressed data packet, but delivers the received compressed data packet to a PDCP layer. For example, refer to FIG. 2. When the RLC layer of the base station (a receiving end) is reestablished, compressed data packets 3, 4, 5, and 7 have been received, but compressed data packets 1, 2, and 6 have not been received. In this case, the RLC layer delivers the compressed data packets 3, 4, 5, and 7 to the PDCP layer. A compressed data packet 0 is received and successfully decompressed by the RLC, and the data packet 0 obtained by decompressing the compressed data packet 1 is delivered to the PDCP layer. After receiving the compressed data packets 3, 4, 5, and 7, the PDCP layer decompresses these compressed data packets. When decompressing the compressed data packet 3, the PDCP layer needs to update a buffer based on a decompression result of the compressed data packet 2, so that the compressed data packet 3 can be successfully decompressed. However, because the PDCP layer does not receive the compressed data packet 2, the PDCP layer fails to decompress the compressed data packet 3. Similarly, the PDCP layer also fails to decompress the compressed data packets 4, 5, and 7. In this case, the PDCP layer discards the compressed data packets 3, 4, 5, and 7. In addition, after receiving the compressed data packet, the RLC layer of the base station sends hybrid automatic repeat request (hybrid automatic repeat request, HARQ)-acknowledgement (ACK) information to the terminal device. For a received compressed data packet, the RLC layer of the base station sends an acknowledgment (ACK) to the terminal device. For example, if the RLC layer has not received the compressed data packet 1 when being reestablished, the RLC layer does not send the ACK of the compressed data packet 1 to the terminal device.

After completing the cell handover, the terminal device (a transmitting end) may retransmit a compressed data packet to the base station. For example, the terminal device sequentially retransmits compressed data packets from a first compressed data packet for which no ACK is received. For example, if the terminal device receives ACKs of the compressed data packets 3, 4, 5, and 7, but does not receive ACKs of the compressed data packets 1, 2, and 6, the terminal device retransmits the compressed data packet 1 to the compressed data packet 7. In a cell handover process, the terminal device reestablishes the PDCP layer, and resets a buffer corresponding to the UDC of the terminal device, a UDC protocol stack, or the like. In this case, the terminal device recompresses the data packet based on a reset buffer.

The compressed data packet 1 to the compressed data packet 7 that are previously sent by the terminal device to the base station are obtained by compressing corresponding data packets based on the buffer before resetting, and the terminal device recompresses these data packets based on the reset buffer, to obtain a compressed data packet 1 to a compressed data packet 7. The terminal device then sends the compressed data packets to the base station. It can be learned that, the terminal device needs to perform compression twice for a same data packet. However, a plurality of compression processes greatly increase processing time of the terminal device, and especially when there are a large quantity of data packets, processing efficiency of the terminal device is greatly reduced.

Currently, a UDC technology exists only in the LTE system, and a new radio (new radio, NR) system has not been introduced. Currently, whether the UDC technology can be used in the NR system has not been determined.

An embodiment of this application provides a communication method. According to the method provided in this embodiment of this application, a buffer-based data compression technology (for example, a UDC technology) can be applied to an NR system. In addition, in this embodiment of this application, when reestablishing a PDCP layer, a terminal device does not reset a first buffer. In this case, if the terminal device needs to retransmit a data packet, the terminal device may retransmit a previously obtained compressed data packet, and does not need to compress the data packet again. This reduces a quantity of compression times of the data packet, reduces processing time of the terminal device, and improves processing efficiency. In addition, because workload of the terminal device is reduced, power consumption of the terminal device is reduced. If the terminal device serves as a data receiving end, the terminal device may also normally process data without resetting a buffer. This reduces workload of the terminal device and reduces power consumption of the terminal device.

The technical solutions provided in this embodiment of this application may be applied to an LTE system, for example, may be applied to a common LTE system or the internet of vehicles such as vehicle to everything (vehicle to everything, V2X) or LTE-V, or may be applied to an NR system, for example, may be applied to a common NR system or the internet of vehicles such as V2X or NR-V, or may be applied to another similar communication system or a next-generation communication system.

Figure 3:
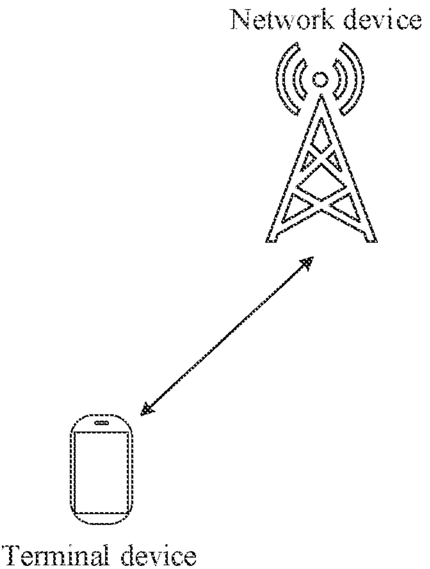
FIG. 3 and FIG. 4 are schematic diagrams of two application scenarios according to an embodiment of this application.

FIG. 3 shows an application scenario according to an embodiment of this application. In FIG. 3, one network device and one terminal device are included. For example, the network device works in an evolved universal mobile telecommunications system terrestrial radio access (evolved UMTS terrestrial radio access, E-UTRA) system, or works in an NR system. For example, the terminal device accesses the network device before and after performing a cell handover.

Figure 4:
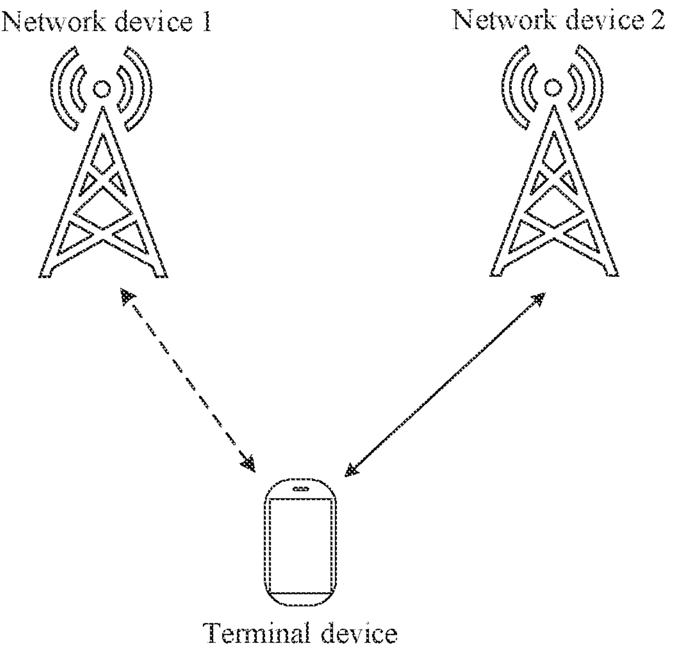

FIG. 4 shows another application scenario according to an embodiment of this application. In FIG. 4, two network devices and one terminal device are included. For example, a network device 1 is a network device accessed by a terminal device before the terminal device performs a cell handover, and a network device 2 is a network device accessed by the terminal device after the terminal device performs the cell handover. For example, the network device 1 or the network device 2 works in an evolved universal mobile telecommunications system terrestrial radio access (evolved UMTS terrestrial radio access, E-UTRA) system, or works in an NR system, and systems in which the network device 1 and the network device 2 work may be the same or different.

The network device in FIG. 3 or FIG. 4 is, for example, a base station. The network device corresponds to a different device in a different system. For example, the network device may correspond to an eNB in a 4G system, and correspond to a 5G network device such as a gNB in a 5G system. In the 5G system, the network device may be a device on a hybrid network constituted by an LTE network device and an NR network device; and the network device and the terminal device form mixed radio-dual connectivity (mixed radio-dual connectivity, MR-DC). Certainly, the technical solutions provided in this embodiment of this application may also be applied to a future mobile communication system. Therefore, the network device in FIG. 3 or FIG. 4 may also correspond to a network device in the future mobile communication system FIG. 3 and FIG. 4 show an example in which the network device is the base station. Actually, with reference to the foregoing descriptions, the network device may alternatively be a device such as an RSU.

An actual application scenario of this embodiment of this application is considered. When a user holds the terminal device, and needs to perform an operation such as VoLTE/voice over new radio (voice over new radio, VoNR) call or data Internet access (for example, initiate live broadcast, play a game, or surf the Internet), the user needs to access a network. At an initial stage of accessing the network, the terminal device usually needs to report, to a base station, whether the terminal device has a capability of supporting data compression. When determining that the terminal device has a capability of supporting data compression, the base station may determine, based on a service initiated by the user, whether to configure a data compression related parameter for the terminal device (for example, configure a corresponding bearer to support a UDC function and an active state). When the base station configures that the terminal device can perform data compression, for example, can perform UDC, the terminal device may use a UDC manner in uplink transmission, for example, in a process of initiating a VoLTE/VoNR call, initiating live broadcast, or playing a real-time game. In this case, the terminal device may perform the UDC by using the method provided in this embodiment of this application. This can reduce or even avoid a packet loss caused by compression of uplink data, and reduce power consumption caused by repeated compression. Similarly, the method provided in this embodiment of this application may also be used for compression of downlink data, to reduce or even avoid a packet loss caused by compression of the downlink data.

In addition, this embodiment of this application is not limited to communication between the network device and the terminal device, and may include communication between network devices or communication between terminal devices.

The technical solutions provided in this embodiment of this application are described below in detail with reference to the accompanying drawings. It should be noted that, in the accompanying drawings corresponding to embodiments of this application, all steps represented by dashed lines are optional steps. In addition, an NR system is used as an example in embodiments of this application.

Before embodiments of this application are described, a UDC technology in embodiments of this application is first described.

Figures 5, 6:
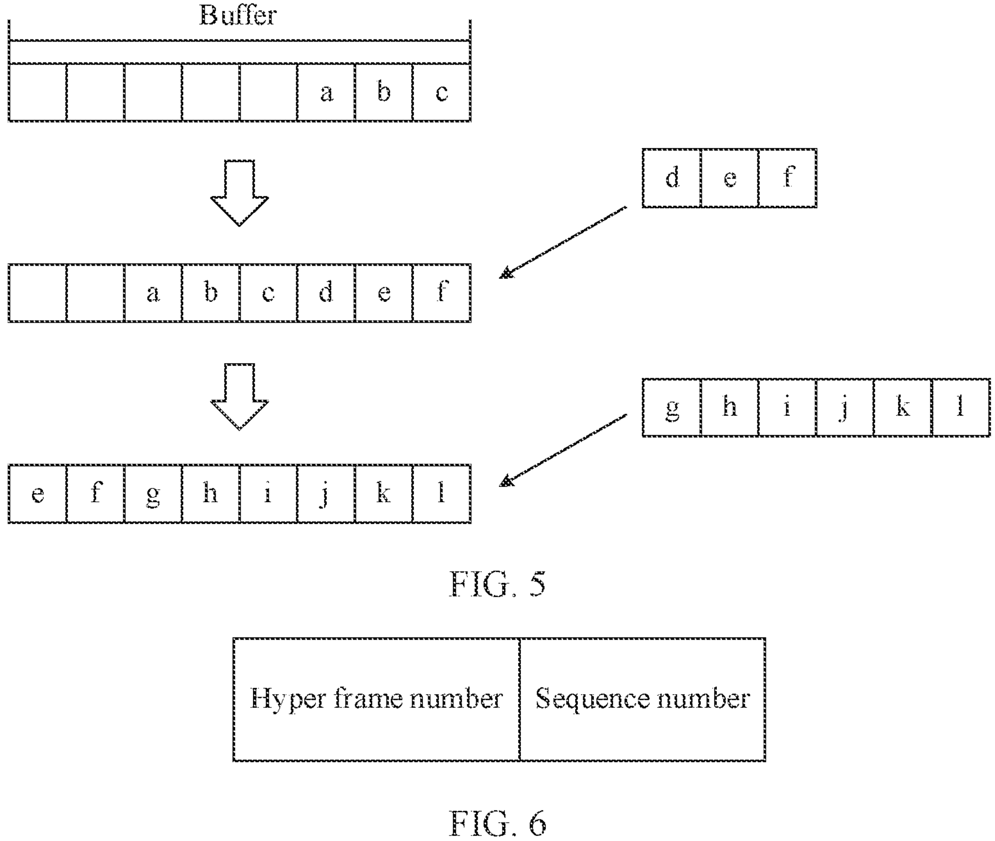
FIG. 5 is a schematic diagram of a UDC technology according to an embodiment of this application.
FIG. 6 is a schematic diagram of composition of a count value of a data packet.

In UDC, a terminal device functions as a transmitting end to compress a data packet, and a network device functions as a receiving end to decompress the data packet. Both compression and decompression are performed based on a same buffer status maintained by the transmitting end and the receiving end. The buffer status may refer to content included in a buffer (or information included in the buffer). When compressing a data packet, the transmitting end compresses the data packet based on a current status of the buffer. After the compression succeeds, the transmitting end places original information of a current compressed data packet before compression into the buffer from a backend of the buffer, to update the buffer. When a first data packet is compressed, the buffer may not include information about a previous data packet. In this case, the transmitting end may perform compression based on preset information, and the preset information is, for example, a predefined dictionary. For example, as shown in FIG. 5, a buffer includes "abc", and "abc" is, for example, a predefined dictionary. When the transmitting end needs to compress a data packet "def", the transmitting end may perform the compression based on "abc", to obtain a compressed data packet 1 after compressing the data packet "def", and the transmitting end may place "def" from the backend of the buffer into the buffer. Then, when the transmitting end needs to compress a data packet "ghijkl", the transmitting end may perform the compression based on "abcdef" in the buffer. In other words, compression is performed based on all content in the buffer each time. After compressing the data packet "ghijkl" and obtaining a compressed data packet 2, the transmitting end may place the data packet "ghijkl" from the backend of the buffer into the buffer. Because storage space of the buffer is limited, "abcd" is squeezed out of the buffer according to a first in first out (first in first out, FIFO) principle. In this case, if the transmitting end needs to compress another data packet, the compression is performed based on "efghijkl" included in the buffer. After receiving the compressed data packet 1, the receiving end may decompress the compressed data packet 1 based on the predefined dictionary "abc" in the buffer, to obtain the data packet "def", and place the data packet "def" from the backend of the buffer into the buffer. After receiving the compressed data packet 2, the receiving end may decompress the compressed data packet 2 based on the information "abcdef" in the buffer, to obtain the data packet "ghijkl", and place the data packet "ghijkl" from the backend of the buffer into the buffer. In this case, "abcd" is squeezed out of the buffer. It can be learned that a buffer status at the receiving end keeps consistent with a buffer status at the transmitting end. This can ensure that the receiving end can correctly perform decompression.

In embodiments of this application, a data packet before compression (also referred to as a data packet below) and a corresponding compressed data packet may have a same sequence number. For example, a first compressed data packet may be obtained by compressing a first data packet, and a sequence number of the first compressed data packet is the same as a sequence number of the first data packet. A second compressed data packet may be obtained by compressing a second data packet, and a sequence number of the second compressed data packet is the same as a sequence number of the second data packet. In addition, the technical solutions provided in embodiments of this application may be applied to transmission of a data radio bearer (data radio bearer, DRB) in UM/AM, applied to transmission of a signaling radio bearer (signaling radio bearer, SRB), or applied to transmission of a quality of service flow (QoS flow) on a DRB.

In transmission over an air interface, each data packet has a number corresponding to a PDCP layer. A number of a data packet at the PDCP layer may include two parts: a sequence number (sequence number, SN) and a hyper frame number (hyper frame number, HFN). A combination of the two parts forms the number of the data packet, on other words, a count (count) value of the data packet. FIG. 6 is a schematic diagram of composition of a count value of a data packet. The sequence number of the data packet in this embodiment of this application may be a sequence number of the data packet or a count value of the data packet.

Figure 7:
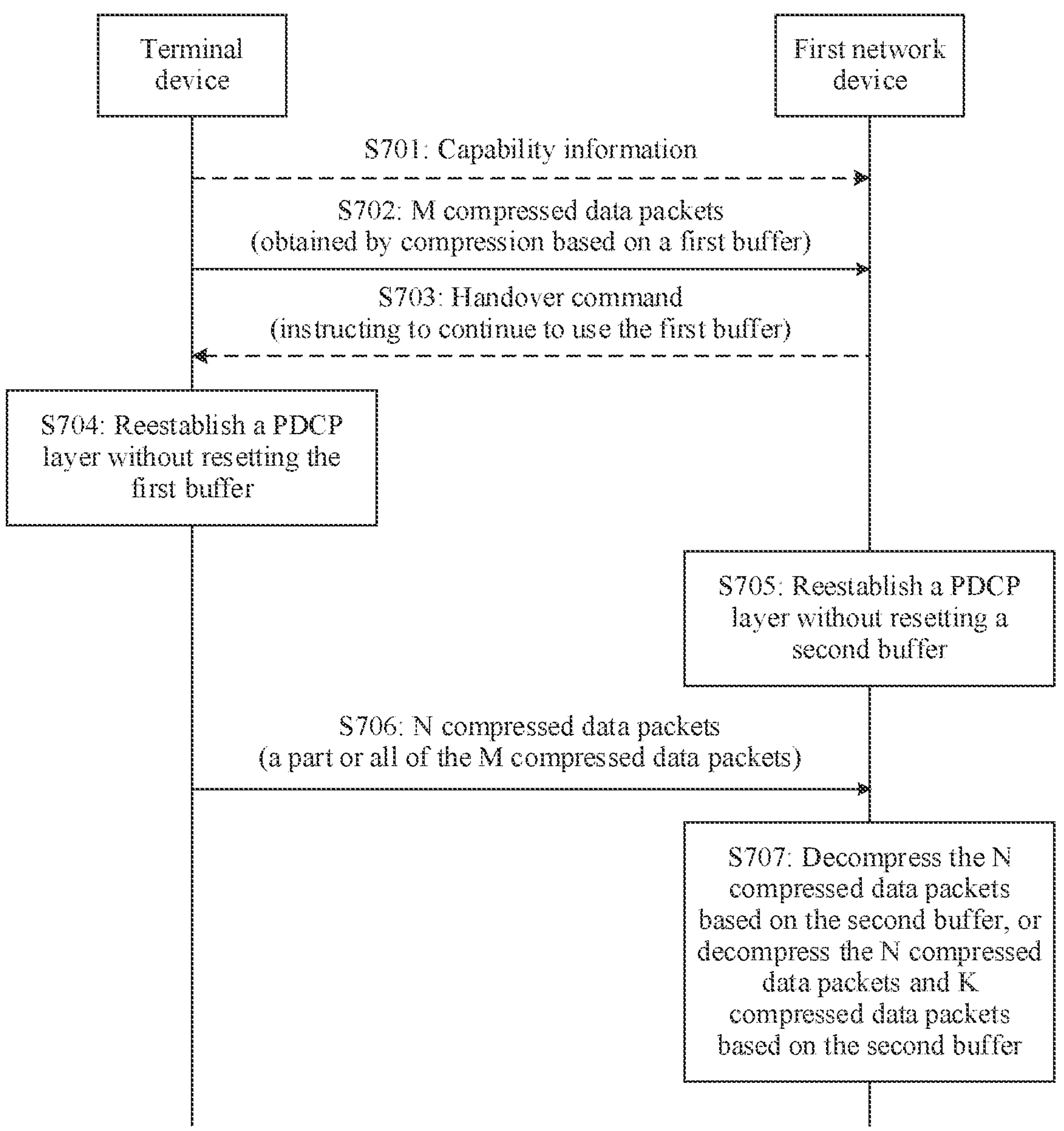
FIG. 7 is a flowchart of a first communication method according to an embodiment of this application.

An embodiment of this application provides a first communication method. FIG. 7 is a flowchart of the method. In the following description process, an example in which the method is applied to the network architecture shown in FIG. 3 is used. The terminal device described below is, for example, the terminal device in the network architecture shown in FIG. 3, and the first network device described below is, for example, the network device in the network architecture shown in FIG. 3.

S701: A terminal device sends capability information to a first network device, and correspondingly, the first network device receives the capability information from the terminal device.

For example, the terminal device may send the capability information to the first network device in a random access process, or the terminal device may send the capability information to the first network device after random access succeeds. The capability information may indicate a capability of the terminal device. For example, the capability information indicates that the terminal device can support UDC. For another example, the capability information may indicate that continuing to use a first buffer is supported, which indicates that the terminal device supports a function of continuing to use the first buffer (the function may also be referred to as buffer continue (buffer continue)); or indicate that continuing to use the first buffer is not supported. The buffer continue may be understood as not resetting a buffer corresponding to a data compression/decompression function when a PDCP layer is reestablished. Therefore, the capability information may also indicate that non-resetting of the first buffer is supported when the PDCP layer is reestablished, or indicate that non-resetting of the first buffer is not supported when the PDCP layer is reestablished. Optionally, in addition, the capability information may further indicate a capability of the terminal device in another aspect, for example, indicate a quantity of antennas supported by the terminal device. This is not limited. The first buffer is maintained by the terminal device, and is used to compress a data packet. In other words, the terminal device may compress the data packet based on the first buffer.

The first network device can determine, based on the capability information, whether the terminal device supports continuing to use the first buffer. If the terminal device supports continuing to use the first buffer, the first network device may indicate the terminal device to continue to use the first buffer. If the terminal device does not support continuing to use the first buffer, the first network device may not indicate the terminal device to continue to use the first buffer or may indicate the terminal device to reset the first buffer. Alternatively, the terminal device may not send the capability information. The first network device may determine, based on another factor, whether to indicate the terminal device to continue to use the first buffer, or whether the terminal device continues to use the first buffer may be specified in a protocol. Therefore, S701 is an optional step.

S702: The terminal device sends M compressed data packets to the first network device, and correspondingly, the first network device receives K compressed data packets from the terminal device. M is a positive integer, and K is a positive integer less than or equal to M. The K compressed data packets may be a part or all of the M compressed data packets, or the K compressed data packets are a subset of the M compressed data packets.

A reason why the first network device receives the K compressed data packets instead of the M compressed data packets is that a case of packet loss is considered. For example, M-K compressed data packets may be lost in a transmission process and are not correctly received by the first network device. Sequence numbers of the K compressed data packets may be consecutive or nonconsecutive. Optionally, the sequence numbers of the K compressed data packets and a sequence number of a data packet successfully decompressed by the first network device are nonconsecutive. For example, the M compressed data packets are a compressed data packet 1 to a compressed data packet 7, and the K compressed data packets are compressed data packets 3, 4, 5, and 7. In this case, the sequence numbers of the K compressed data packets are nonconsecutive. In addition, a compressed data packet with a largest sequence number that has been successfully decompressed by the first network device is a compressed data packet 0. In this case, the sequence numbers of the K compressed data packets and a sequence number of a last data packet that has been successfully decompressed by the first network device and delivered to an upper layer are nonconsecutive either. For another example, the M compressed data packets are a compressed data packet 1 to a compressed data packet 7, and the K compressed data packets are compressed data packets 3, 4, 5, and 6. In this case, the sequence numbers of the K compressed data packets are consecutive. In addition, a compressed data packet with a largest sequence number that has been successfully decompressed by the first network device is a compressed data packet 0. In this case, the sequence numbers of the K compressed data packets and a sequence number of a data packet that has been successfully decompressed by the first network device are nonconsecutive.

The M compressed data packets are obtained by the terminal device by compressing M data packets based on the first buffer, and there is a one-to-one correspondence between the compressed data packets and the data packets. The first buffer is a buffer used by the terminal device to compress a data packet. For example, the terminal device may compress the data packet based on the first buffer by using a UDC technology. For example, the first buffer corresponds to a first radio bearer. The first radio bearer may include all or a part of radio bearers of the terminal device. The radio bearer is, for example, a DRB or an SRB. Alternatively, for example, the first buffer corresponds to one or more QoS flows in a DRB.

For example, before sending the M compressed data packets, the terminal device has not sent a compressed data packet to the first network device. In this case, before the terminal device compresses the M compressed data packets, the first buffer includes, for example, a predefined dictionary, that is, the first buffer is filled with a predefined dictionary. The terminal device compresses a data packet 1 in the M data packets based on the predefined dictionary, to obtain the compressed data packet 1. Then, the terminal device updates the first buffer based on content of the data packet 1, and then compresses a data packet 2 in the M data packets based on an updated first buffer to obtain the compressed data packet 2, and so on, until the M compressed data packets are obtained. For an example of this process, refer to FIG. 5.

The first network device may send feedback information for the K compressed data packets to the terminal device, to indicate that the first network device has received the K compressed data packets. For example, each time an RLC layer of the first network device receives one compressed data packet, the first network device may send an ACK of the compressed data packet to the terminal device. In this case, the first network device may send a total of K ACKs to the terminal device, and the K ACKs correspond to the K compressed data packets. After receiving the K ACKs, the terminal device may learn that the first network device receives the K compressed data packets.

Optionally, a PDCP layer of the first network device may further send a status report to the terminal device. The status report may indicate a compressed data packet that has been received by the first network device. For this embodiment of this application, the status report may indicate the K compressed data packets. After receiving the status report, the terminal device may learn that the first network device receives the K compressed data packets. For example, the status report may be implemented by using a bitmap (bitmap). A quantity of bits included in the bitmap may be M, and the M bits are in a one-to-one correspondence with the M compressed data packets. If the first network device receives a compressed data packet, a bit corresponding to the compressed data packet is set to "1". If the first network device does not receive a compressed data packet, a bit corresponding to the compressed data packet is set to "0". In this way, the terminal device can quickly determine which compressed data packets are received by the first network device. For another example, the status report may include a sequence number of a compressed data packet that has been received by the first network device, and/or include a sequence number of a compressed data packet that has not been received by the first network device. In this way, the terminal device can determine which compressed data packets are received by the first network device.

It should be noted that the terminal device may perform corresponding processing on the compressed data packet before sending the compressed data packet. For example, the terminal device performs integrity protection and encryption processing (for example, performs corresponding processing at a PDCP layer) on the compressed data packet, and delivers a processed compressed data packet to a bottom layer of the terminal device (for example, an RLC layer, a media access control (media access control, MAC) layer, or a physical layer). Then, the bottom layer of the terminal device sends the processed compressed data packet. The terminal device may send the M compressed data packets in a similar manner, and the terminal device may send N compressed data packets described below in a similar manner. Details are not described again.

S703: The first network device sends a handover command to the terminal device, and correspondingly, the terminal device receives the handover command from the first network device.

For example, the handover command includes first indication information, and the first indication information may indicate to reestablish the PDCP layer, or indicate to perform a cell handover. Optionally, the handover command may further include second indication information. The second indication information may indicate to continue to use the first buffer, or the second indication information may indicate not to reset the first buffer when the PDCP layer is reestablished. In this case, if the handover command includes the second indication information, the terminal device may continue to use the first buffer when reestablishing the PDCP layer, or if the handover command does not include the second indication information, the terminal device does not continue to use the first buffer when reestablishing the PDCP layer. For example, when reestablishing the PDCP layer, the terminal device resets the first buffer. Alternatively, in this case, the second indication information indicates whether to reset the first buffer when the PDCP layer is reestablished. Alternatively, in this case, a value of the second indication information indicates whether to reset the first buffer when the PDCP layer is reestablished.

Alternatively, the second indication information may not be included in the handover command, and the first network device may send the second indication information to the terminal device by using another message. In this case, the first network device may send the second indication information to the terminal device before S703, or send the second indication information to the terminal device after S703, or the first network device may send the handover command and the second indication information to the terminal device at the same time. In this case, if the terminal device receives the second indication information, the terminal device may continue to use the first buffer when reestablishing the PDCP layer, or if the terminal device does not receive the second indication information, the terminal device does not continue to use the first buffer when reestablishing the PDCP layer. For example, when reestablishing the PDCP layer, the terminal device may reset the first buffer.

In a case that the first network device sends the second indication information, the first network device supports continuing to use a second buffer. The second buffer corresponds to the first buffer, and is maintained by the first network device. For example, the first network device may decompress, based on the second buffer, a compressed data packet obtained based on the first buffer (or a data packet compressed based on the first buffer). In a case that the first network device does not send the second indication information, the first network device may support continuing to use the second buffer, or may not support continuing to use the second buffer. Regardless of whether the first network device supports continuing to use the second buffer, because the first network device does not send the second indication information, the first network device does not continue to use the second buffer when reestablishing the PDCP layer, but resets the second buffer, to keep consistent with behavior of the terminal device.

Alternatively, for example, if the protocol specifies that the first buffer continues to be used, or the protocol specifies that the first buffer is not reset when the PDCP layer is reestablished, the first network device may not send the second indication information. In this case, the network device may determine, according to the protocol, to continue to use the second buffer when reestablishing the PDCP layer, and the terminal device may determine, according to the protocol, to continue to use the first buffer when reestablishing the PDCP layer.

Other than the case in which the cell handover is performed, the terminal device may reestablish the PDCP layer in another case. Therefore. S703 is an optional step.

S704: The terminal device reestablishes the PDCP layer without resetting the first buffer.

When performing the cell handover, the terminal device may reestablish the PDCP layer. Alternatively, the terminal device may reestablish the PDCP layer when being triggered by another event other than the cell handover. Therefore, S703 is an optional step.

If the terminal device receives the second indication information, or the protocol specifies that the first buffer continues to be used, the terminal device may not reset the first buffer when reestablishing the PDCP layer. However, if the terminal device does not receive the second indication information, and the protocol does not specify that the first buffer continues to be used, the terminal device may reset the first buffer when reestablishing the PDCP layer. That the terminal device resets the first buffer includes, for example, clearing content of the first buffer, and adding the predefined dictionary to the cleared first buffer. In embodiments of this application, content of the predefined dictionary is, for example, related to a service. When services performed by devices are different, predefined dictionaries may be the same or may be different. Alternatively, content of the predefined dictionary may be related to another factor. This is not specifically limited, and details are not described below again. In this embodiment of this application, an example in which the terminal device does not reset the first buffer when reestablishing the PDCP layer is used.

S705. The first network device reestablishes the PDCP layer without resetting the second buffer.

If the terminal device performs the cell handover, the first network device also reestablishes the PDCP layer. In this embodiment of this application, the terminal device accesses the first network device before and after performing the cell handover. For example, the terminal device is handed over from a first cell provided by the first network device to a second cell provided by the first network device. If the first network device determines to continue to use the second buffer, the first network device does not reset the second buffer when reestablishing the PDCP layer. However, if the first network device determines not to continue to use the second buffer, the first network device may reset the second buffer when reestablishing the PDCP layer. That the first network device resets the second buffer includes, for example, clearing content of the second buffer, and adding the predefined dictionary to the cleared second buffer. For the first network device and the terminal device, because buffer statuses need to be kept consistent, the predefined dictionary used to reset the first buffer and the predefined dictionary used to reset the second buffer may be the same. In this embodiment of this application, an example in which the first network device does not reset the second buffer when reestablishing the PDCP layer is used.

S704 may be performed before S705, or may be performed after S705, or may be simultaneously performed with S705.

S706: The terminal device sends N compressed data packets to the first network device, and correspondingly, the first network device receives the N compressed data packets from the terminal device. The N compressed data packets are a part or all of the M compressed data packets. For example, N is an integer less than or equal to M.

After completing the cell handover or completing PDCP layer reestablishment, if the terminal device is not handed over between network devices, the terminal device may retransmit the N compressed data packets to the first network device. The terminal device sends the N compressed data packets in ascending order of sequence numbers of the compressed data packets from a first compressed data packet that is not determined to be successfully received by the first network device. For example, a first compressed data packet in the N compressed data packets (or a compressed data packet with a smallest sequence number in the N compressed data packets) may be a first compressed data packet that is not successfully received by the first network device (or a compressed data packet with a smallest sequence number in data packets that are not successfully received by the first network device). For example, the M compressed data packets are a compressed data packet 1 to a compressed data packet 7, the K compressed data packets are compressed data packets 3, 4, 5, and 7, and the N compressed data packets are the compressed data packet 1 to the compressed data packet 7. In this case, the first compressed data packet in the N compressed data packets is the compressed data packet 1. The compressed data packet 1 is the first compressed data packet that is not successfully received by the first network device.

In the foregoing example, N=M, and this is equivalent to that the terminal device retransmits the M compressed data packets. In this way, a success rate of obtaining the compressed data packets by the first network device can be improved. Optionally, if the first network device sends the status report to the terminal device, and the status report indicates the compressed data packet that has been received by the first network device, the terminal device may no longer send the compressed data packet that has been received by the first network device, but needs to send only the compressed data packet that has not been received by the first network device. In this case, the N compressed data packets may not include the compressed data packet that has been received by the first network device. For example, the M compressed data packets are the compressed data packet 1 to the compressed data packet 7, the K compressed data packets are the compressed data packets 3, 4, 5, and 7, and the status report sent by the first network device to the terminal device indicates the K compressed data packets. In this case, the N compressed data packets sent by the terminal device are, for example, compressed data packets 1, 2, and 6, and the terminal device may no longer send the compressed data packets 3, 4, 5, and 7. In this way, an amount of data retransmitted by the terminal device can be reduced, and transmission overheads can be reduced.

Figure 8:
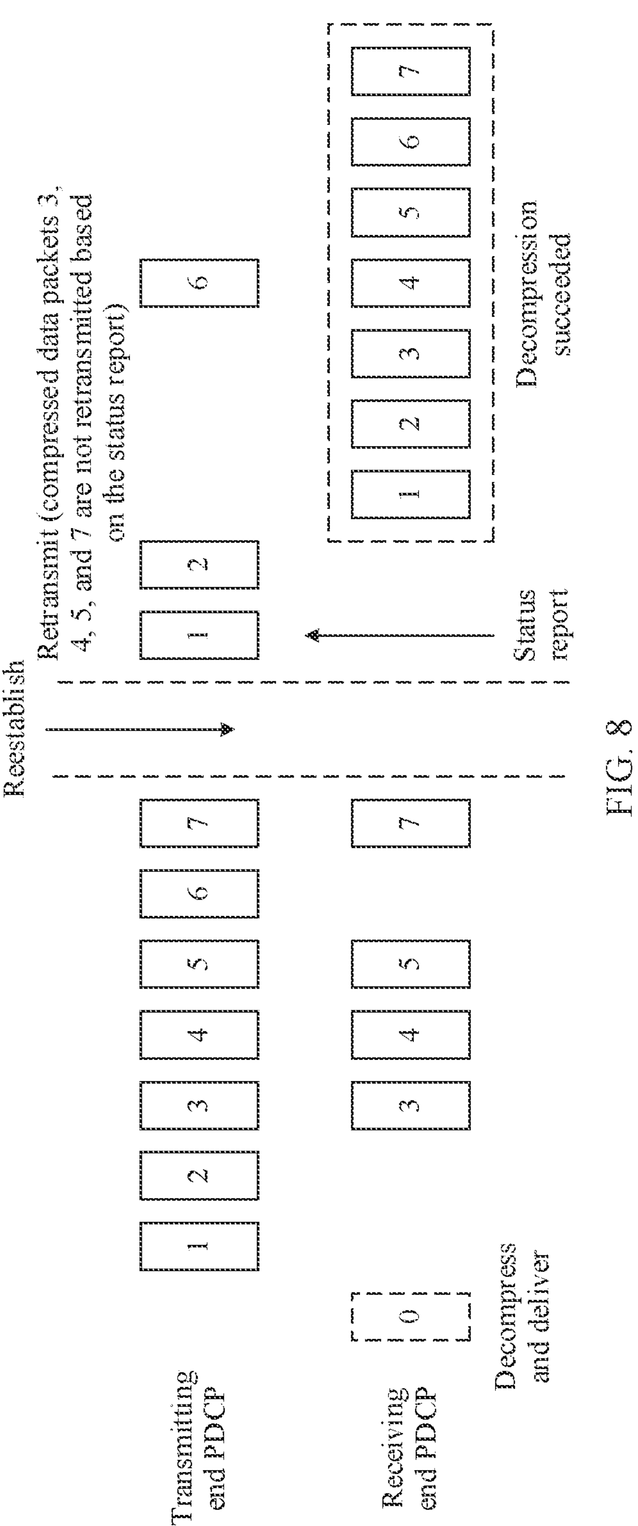
FIG. 8 is a schematic diagram of retransmitting some compressed data packets by a terminal device according to an embodiment of this application.

Refer to FIG. 8, M compressed data packets sent by a PDCP layer of a terminal device are, for example, a compressed data packet 1 to a compressed data packet 7. A PDCP layer of a first network device receives the compressed data packets 3, 4, 5, and 7, but does not receive the compressed data packets 1, 2, and 6. In addition, the PDCP layer of the terminal device further sends a compressed data packet 0 to the first network device before sending the M compressed data packets. The PDCP layer of the first network device receives the compressed data packet 0, and successfully decompresses the compressed data packet 0, to obtain a data packet 0. In this case, the PDCP layer of the first network device delivers the data packet 0 to an upper layer of the PDCP layer, for example, a service data adaptation protocol (service data adaptation protocol, SDAP) layer. The PDCP layer of the first network device sends a status report to the PDCP layer of the terminal device. The status report indicates that the first network device has received the compressed data packets 3, 4, 5, and 7. For example, the status report is implemented by using a bitmap. The bitmap may include seven bits. The bitmap is, for example, 1011100, which sequentially correspond to the compressed data packet 1 to the compressed data packet 7 from low-order bits to high-order bits. The first network device receives the compressed data packets 3, 4, 5, and 7. In this case, values of bits corresponding to these compressed data packets are "1". The first network device does not receive the compressed data packets 1, 2, and 6. In this case, values of bits corresponding to these compressed data packets are "0". After the terminal device receives the status report, the PDCP layer of the terminal device retransmits the compressed data packets 1, 2, and 6 to the first network device, and does not need to retransmit the compressed data packets 3, 4, 5, and 7, to save uplink transmission resources.

Figure 9:
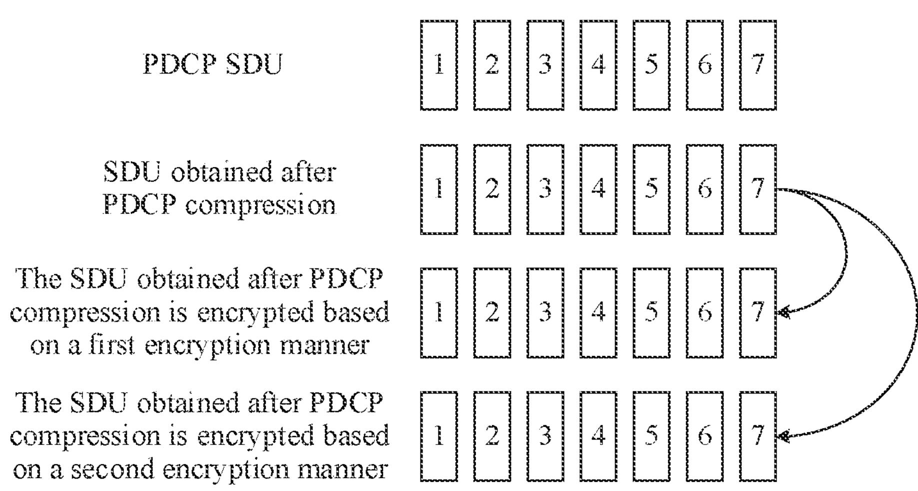
FIG. 9 is a schematic diagram of compressing a data packet by a terminal device according to an embodiment of this application.

FIG. 9 is a process in which a terminal device compresses data packets 1 to 7, 1 to 7 in the first row in FIG. 9 indicate seven PDCP service data units (service data units, SDUs), that is, seven data packets. In other words, 1 to 7 in the first row indicate seven to-be-compressed data packets. The second row indicates compressed data packets 1 to 7 obtained after the terminal device compresses the data packets 1 to 7 based on a first buffer. The third row indicates an encrypted data packet 1 to an encrypted data packet 7 that are obtained after the compressed data packet 1 to the compressed data packet 7 in the second row are encrypted in a first encryption manner. The terminal device may send the seven encrypted data packets to a first network device. This process may be considered as that the terminal device sends M compressed data packets to the first network device. For example, M=7, the seven encrypted data packets are obtained by encrypting the M compressed data packets in the first encryption manner, and the first encryption manner is an encryption manner corresponding to a first cell accessed by the terminal device before the terminal device performs a cell handover. The fourth row indicates an encrypted data packet 1 to an encrypted data packet 7 that are obtained after the compressed data packet 1 to the compressed data packet 7 in the second row are encrypted in a second encryption manner. The terminal device may send the seven encrypted data packets to the first network device. This process may be considered as that the terminal device sends N compressed data packets to the first network device. For example, N=7, the seven encrypted data packets are obtained by encrypting the N compressed data packets in the second encryption manner, and the second encryption manner is an encryption manner corresponding to a second cell accessed by the terminal device after the terminal device performs the cell handover. It can be learned from FIG. 9 that, the terminal device performs a compression process for these data packets only once. If the compressed data packets need to be retransmitted, the obtained compressed data packets need only to be encrypted based on a corresponding encryption manner after the cell handover, and the data packets do not need to be compressed again. This reduces a compression process of the terminal device, and correspondingly improves processing efficiency of the terminal device.

For the first network device, after receiving the K compressed data packets, if the first network device does not send the status report to the terminal device, the first network device may decompress the K compressed data packets. Because the sequence numbers of the K compressed data packets and the sequence number of the data packet that has been successfully decompressed by the first network device are nonconsecutive, the first network device may fail to decompress the K compressed data packets, and the first network device may discard the K compressed data packets that fail to be decompressed. The terminal device further sends the N compressed data packets to the first network device. Because the terminal device does not receive the status report, the compressed data packet with a smallest sequence number in the N compressed data packets is a compressed data packet with a smallest sequence number in compressed data packets that are not successfully received by the first network device, and sequence numbers of the N data packets are consecutive. For example, the M compressed data packets are the compressed data packet 1 to the compressed data packet 7, the K compressed data packets are the compressed data packets 3, 4, 5, and 7, and the N compressed data packets are the compressed data packet 1 to the compressed data packet 7. In this way, even if the first network device discards the K compressed data packets, because the terminal device sends the N compressed data packets again, and the N compressed data packets include the K compressed data packets, the first network device can still obtain the K compressed data packets. The foregoing example continues to be used. Because the first network device obtains the compressed data packets 1 to 7, and the first network device has previously performed correct decompression on the compressed data packet 0, a status of the second buffer is determined based on the data packet 0. In this case, the first network device can correctly decompress the compressed data packet 1 to the compressed data packet 7 based on the second buffer that is not reset.

Alternatively, after receiving the K compressed data packets, if the first network device does not send the status report to the terminal device, the first network device may not decompress the K compressed data packets, but wait for the N compressed data packets from the terminal device. The PDCP layer may have a deduplication function. For example, the first network device has received the compressed data packet 3, and the first network device does not discard the compressed data packet 3, if the N compressed data packets include the compressed data packet 3, after receiving the compressed data packet 3 in the N compressed data packets, the first network device discards the compressed data packet 3, and continues to store the previously received compressed data packet 3. For example, the M compressed data packets are the compressed data packet 1 to the compressed data packet 7, the K compressed data packets are the compressed data packets 3, 4, 5, and 7, and the N compressed data packets are the compressed data packet 1 to the compressed data packet 7. In this case, the first network device discards the compressed data packets 3, 4, 5, and 7 in the N received compressed data packets. However, because the second buffer is not reset, the compressed data packets 3, 4, 5, and 7 stored in the first network device are the same as the compressed data packets 3, 4, 5, and 7 discarded by the first network device. Therefore, the first network device can still correctly decompress, based on the second buffer that is not reset, the K compressed data packets 3, 4, 5, and 7 and the compressed data packets 1, 2, and 6 in the N compressed data packets. In this manner, a packet loss rate of the first network device can be reduced.

After receiving the K compressed data packets, if the first network device sends the status report to the terminal device, the N compressed data packets sent by the terminal device may no longer include the K compressed data packets. If the first network device compresses the K compressed data packets, the K compressed data packets are discarded due to a decompression failure, and the terminal device no longer sends the K compressed data packets, the first network device cannot obtain the K compressed data packets, and decompression of other compressed data packets performed by the first network device may be affected. Therefore, after receiving the K compressed data packets, if the first network device sends the status report to the terminal device, the first network device may not decompress the K compressed data packets, but wait for the N compressed data packets from the terminal device. In addition, because the terminal device does not repeatedly send a data packet with a same sequence number, the first network device does not need to use the deduplication function. For example, the M compressed data packets are the compressed data packet 1 to the compressed data packet 7, the K compressed data packets are the compressed data packets 3, 4, 5, and 7, and the N compressed data packets are the compressed data packets 1, 2, and 6. The first network device can correctly decompress the K compressed data packets 3, 4, 5, and 7 and the N compressed data packets 1, 2, and 6 based on the second buffer that is not reset.

S707: The first network device decompresses the N compressed data packets based on the second buffer, or the first network device decompresses the N compressed data packets and the K compressed data packets based on the second buffer.

For example, if the N compressed data packets include the K compressed data packets, it may be understood that the first network device decompresses the N compressed data packets based on the second buffer. For example, the M compressed data packets are the compressed data packet 1 to the compressed data packet 7, the K compressed data packets are the compressed data packets 3, 4, 5, and 7, and the N compressed data packets are the compressed data packet 1 to the compressed data packet 7. In this case, the first network device decompresses the compressed data packet 1 to the compressed data packet 7 based on the second buffer.

For another example, if the N compressed data packets include the K compressed data packets, it may be understood that the first network device decompresses the N compressed data packets and the K compressed data packets based on the second buffer. For example, the M compressed data packets are the compressed data packet 1 to the compressed data packet 7; the K compressed data packets are the compressed data packets 3, 4, 5, 7, and the N compressed data packets are the compressed data packets 1, 2, and 6. In this case, the first network device decompresses the compressed data packet 1 to the compressed data packet 7 based on the second buffer, and the compressed data packet 1 to the compressed data packet 7 are a union set of the K compressed data packets and the N compressed data packets.

According to the technical solutions provided in this embodiment of this application, a quantity of times of compression by the terminal device can be reduced, and processing efficiency of the terminal device can be improved. If the first network device sends the status report to the terminal device, an amount of data transmitted by the terminal device can be reduced, and transmission overheads can be reduced. In addition, because neither the first buffer of the terminal device nor the second buffer of the first network device is reset, when the first network device does not send the status report to the terminal device, regardless of whether the first network device decompresses the K compressed data packets after receiving the K compressed data packets, the first network device can obtain the M compressed data packets. This reduces a packet loss quantity.

The foregoing describes a case in which the terminal device and the first network device do not reset the buffer. If the second indication information received by the terminal device indicates that the first buffer does not continue to be used, or the protocol specifies that the first buffer does not continue to be used, the terminal device may reset the first buffer when reestablishing the PDCP layer, and the first network device also resets the second buffer. The following briefly describes processing manners of the terminal device and the first network device in this case.

Figure 2:
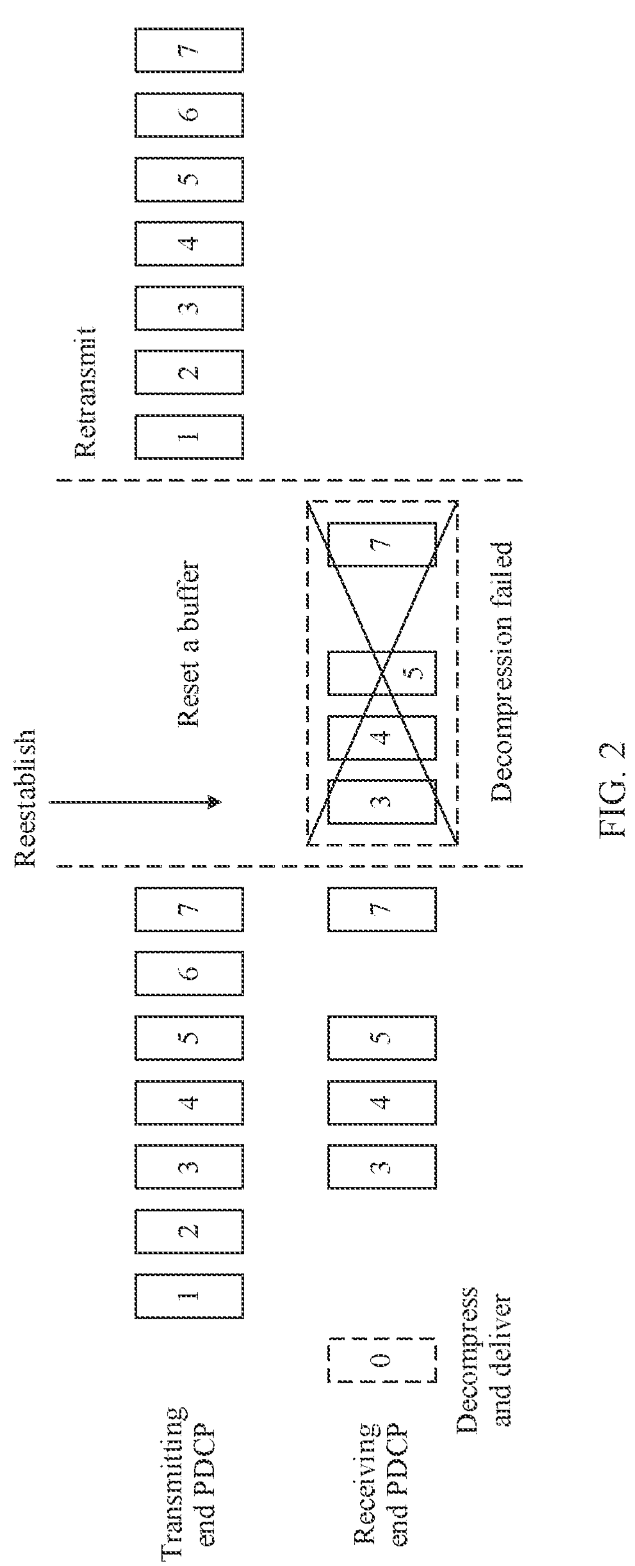
FIG. 2 is a schematic diagram of a data packet transmission process between a terminal device and a base station when a cell handover occurs on the terminal device in an LTE system.

For example, still refer to FIG. 2. When the PDCP layer of the first network device is reestablished, the compressed data packets 3, 4, 5, and 7 have been received, and the compressed data packets 1, 2, and 6 have not been received. The compressed data packet 0 is a compressed data packet that is received and successfully decompressed by the PDCP layer, and the PDCP layer decompresses the compressed data packet 0 to obtain the data packet 0. After the PDCP layer receives the compressed data packets 3, 4, 5, and 7, a PDCP reestablishment indication may trigger decompression of these compressed data packets, and the PDCP layer fails to decompress the compressed data packets 3, 4, 5, and 7. In this case, the PDCP layer discards the compressed data packets 3, 4, 5, and 7, or the PDCP reestablishment indication may trigger the PDCP layer to discard out-of-order compressed data packets (there is a special case in which packets from a transmitting end are uncompressed data packets, even if these data packets are out of order, these data packets do not need to be discarded). That is, the PDCP layer does not decompress the compressed data packets 3, 4, 5, and 7, but directly discards the compressed data packets 3, 4, 5, and 7. A solution of directly discarding out-of-order compressed data packets can reduce a quantity of decompression times at a receiving end, improve processing efficiency, save energy consumption, and avoid a waste of resources for invalid decompression processing. In addition, after receiving the compressed data packet, the RLC layer of the first network device sends ACK information to the terminal device. For example, for a received compressed data packet, the RLC layer of the first network device sends an ACK to the terminal device. If the first network device subsequently sends a feedback report of the PDCP layer to the terminal device, the feedback report may indicate a data packet that is not received by the first network device, or may indicate a data packet that is not successfully decompressed by the first network device.

After completing the cell handover or PDCP layer reestablishment, the terminal device may retransmit the compressed data packet to the first network device. For example, the terminal device sequentially retransmits compressed data packets from a first compressed data packet for which no ACK is received. For example, if the terminal device receives ACKs of the compressed data packets 0, 3, 4, 5, and 7, but does not receive ACKs of the compressed data packets 1, 2, and 6, the terminal device retransmits the compressed data packet 1 to the compressed data packet 7. In a cell handover process, the terminal device reestablishes the PDCP layer, and resets the first buffer. In this case, the terminal device recompresses the data packet based on a reset first buffer. The compressed data packet 1 to the compressed data packet 7 that are previously sent by the terminal device to the first network device are obtained by compressing the data packet 1 to the data packet 7 based on the first buffer before resetting, and the terminal device recompresses the data packet 1 to the data packet 7 based on the reset first buffer, to obtain the compressed data packet 1 to the compressed data packet 7. The terminal device then sends the compressed data packets to the first network device. It can be learned that, if the first buffer does not continue to be used, the terminal device needs to perform compression twice for a same data packet.

In this embodiment of this application, the first network device may indicate whether to continue to use the first buffer, and the first network device may correspondingly indicate, based on a specific situation, whether to continue to use the first buffer. For example, for a terminal device with a low capability, the first network device may not indicate to continue to use the first buffer, or may indicate not to continue to use the first buffer, to meet a capability requirement of the terminal device. For another example, in a scenario with a high delay requirement, the first network device may indicate to continue to use the first buffer, and the terminal device needs to perform compression only once. This reduces processing time of the terminal device, thereby reducing a transmission delay of a data packet. It can be learned that a solution in this embodiment of this application is flexible.

Figure 10:
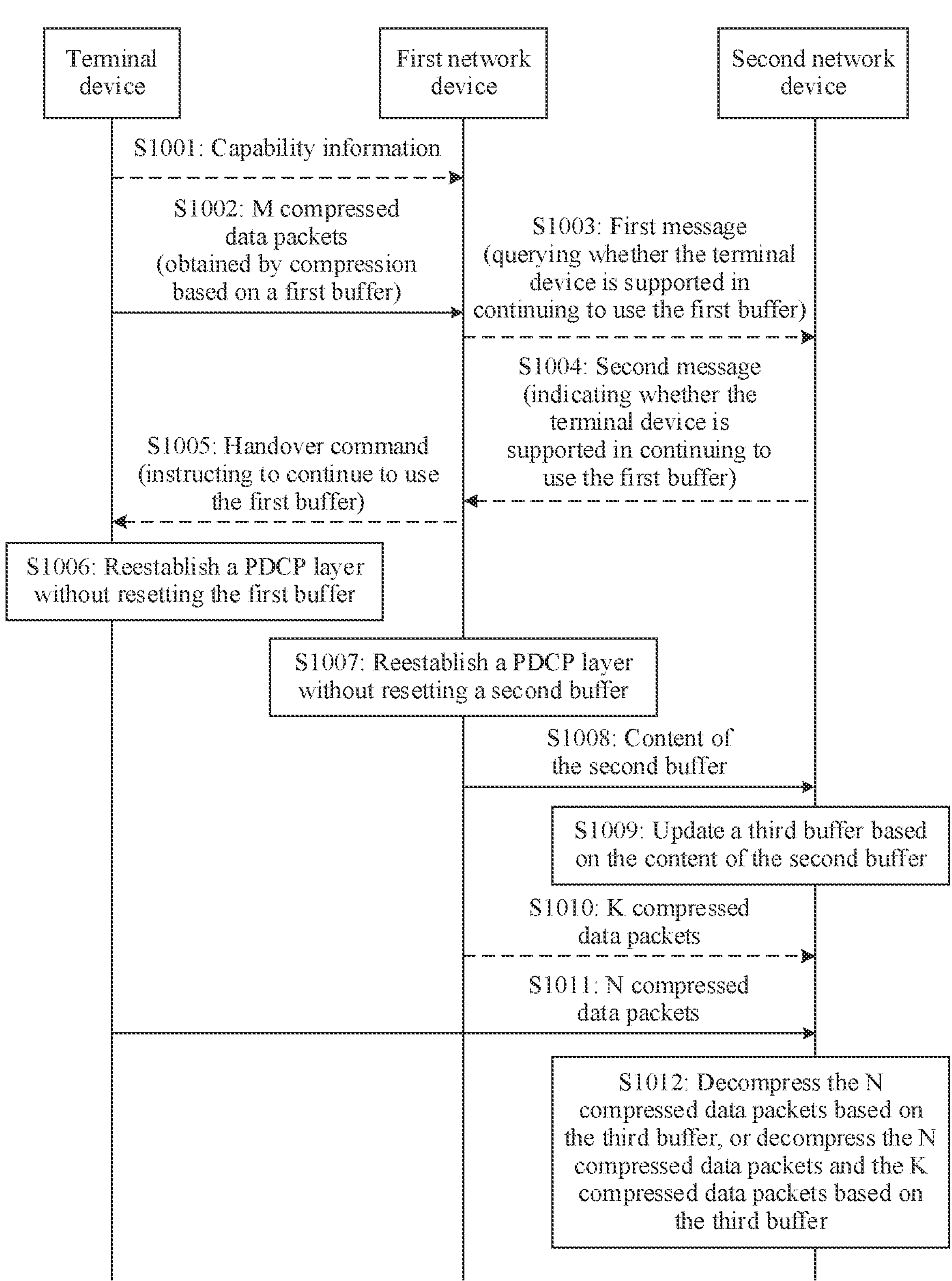
FIG. 10 is a flowchart of a second communication method according to an embodiment of this application.

A scenario to which the embodiment shown in FIG. 7 is applied is a co-site scenario, that is, the terminal device accesses a same network device before and after a handover. The following describes a second communication method according to an embodiment of this application. The method may be applied to the network architecture shown in FIG. 4. FIG. 10 is a flowchart of the method. In the method, a terminal device accesses a first network device before performing a cell handover, and accesses a second network device after performing the cell handover. It may be understood that the terminal device hands over from a first cell provided by the first network device to a second cell provided by the second network device, and the first network device and the second network device are different network devices. The terminal device described below is, for example, the terminal device in the network architecture shown in FIG. 4, the first network device described below is, for example, the network device 1 in the network architecture shown in FIG. 4, and the second network device described below is, for example, the network device 2 in the network architecture shown in FIG. 4.

S1001: A terminal device sends capability information to a first network device, and correspondingly, the first network device receives the capability information from the terminal device.

For more content of S1001, refer to S701 in the embodiment shown in FIG. 7.

S1002: The terminal device sends M compressed data packets to the first network device, and correspondingly, the first network device receives K compressed data packets from the terminal device. M is a positive integer, and K is a positive integer less than or equal to M.

In this embodiment of this application, after receiving the K compressed data packets, the first network device may send feedback information for the K compressed data packets to the terminal device. For example, an RLC layer of the first network device may send K ACKs to the terminal device. Optionally, the first network device may further send a status report of the K compressed data packets to the terminal device. The status report indicates compressed data packets that have been received by the first network device, for example, indicate the K compressed data packets. For the content, refer to S702 in the embodiment shown in FIG. 7. Alternatively, the first network device may not send the status report of the K compressed data packets to the terminal device.

For more content of S1002, refer to S702 in the embodiment shown in FIG. 7.

S1003: The first network device sends a first message to a second network device, and correspondingly, the second network device receives the first message from the first network device. The first message may be used to query whether the terminal device is supported in continuing to use a first buffer after a handover, or the first message may be used to query whether the terminal device is supported in not resetting a first buffer when reestablishing a PDCP layer. The first buffer is a buffer that is maintained by the terminal device and used to compress a data packet. If the first buffer is reset, content of a third buffer that is maintained by the second network device and used to decompress the data packet also needs to be in a reset state. For example, a predefined dictionary is filled in the third buffer. The third buffer is maintained by the second network device, and the second network device may decompress, based on the third buffer, the data packet compressed based on the first buffer.

The first buffer, a second buffer, and the third buffer are all in a correspondence. The first buffer is maintained by the terminal device, and the terminal device compresses the data packet based on the first buffer. The second buffer is maintained by the first network device. The terminal device accesses the first network device before performing a cell handover. The first network device may decompress, based on the second buffer, a compressed data packet (a data packet compressed based on the first buffer) from the terminal device. The third buffer is maintained by the second network device. The terminal device accesses the second network device after performing the cell handover. The second network device may decompress, based on the third buffer, the compressed data packet (the data packet compressed based on the first buffer) from the terminal device.

For example, the first message is a handover request (handover request) message. It may be understood that the handover request message includes query information, and the query information may be used to query whether the second network device supports the terminal device in continuing to use the first buffer. Alternatively, the first message may be another message.

S1004: The second network device sends a second message to the first network device, and correspondingly, the first network device receives the second message from the second network device. The second message may indicate that the terminal device is supported in continuing to use the first buffer, or indicate that the terminal device is not supported in continuing to use the first buffer. Alternatively, the second message may indicate that the terminal device is supported not to reset the first buffer when reestablishing the PDCP layer, or indicate that the terminal device is not supported not to reset the first buffer when reestablishing the PDCP layer. For example, the second message is a handover request acknowledge (handover request acknowledge) message. It may be understood that the handover request acknowledge message includes third indication information, and the third indication information may indicate that the terminal device is supported in continuing to use the first buffer, or indicate that the terminal device is not supported in continuing to use the first buffer. Alternatively, the third indication information may indicate that the terminal device is supported not to reset the first buffer when reestablishing the PDCP layer, or indicate that the terminal device is not supported not to reset the first buffer when reestablishing the PDCP layer. Alternatively, the second message may be another message.

Alternatively, the first network device may not need to learn whether the second network device supports the terminal device in continuing to use the first buffer, or the first network device may learn, in another manner, whether the second network device supports the terminal device in continuing to use the first buffer. Therefore, S1003 and S1004 are optional steps.

S1005: The first network device sends a handover command to the terminal device, and correspondingly, the terminal device receives the handover command from the first network device. The handover command may instruct the terminal device to perform the cell handover, or instruct PDCP to perform reestablishment. Optionally, the handover command may further include information that indicates the terminal device to continue to use the first buffer or not to continue to use the first buffer.

For more content of S1005, refer to S703 in the embodiment shown in FIG. 7.

S1006; The terminal device reestablishes the PDCP layer without resetting the first buffer.

For more content of S1006, refer to S704 in the embodiment shown in FIG. 7.

S1007: The first network device reestablishes the PDCP layer without resetting the second buffer.

For more content of S1007, refer to S705 in the embodiment shown in FIG. 7.

S1008: The first network device sends content of the second buffer to the second network device, and correspondingly, the second network device receives the content of the second buffer from the first network device. For example, the first network device may send indication information to the second network device. To distinguish from the foregoing indication information, the indication information may also be referred to as fourth indication information, and the fourth indication information may indicate the content of the second buffer. For example, the fourth indication information includes the content of the second buffer (for example, depending on a size of the second buffer, a common configuration of the size of the second buffer is 2k bytes, 4k bytes, or 8k bytes), or the fourth indication information does not include the content of the second buffer, but the second network device may determine the content of the second buffer based on the fourth indication information.

If the second network device supports the terminal device in continuing to use the first buffer, the first network device may send the fourth indication information to the second network device; or if the second network device does not support the terminal device in continuing to use the first buffer, the first network device may not need to send the fourth indication information to the second network device.

Alternatively, a same message may be used in S1008 and S1003. The first network device sends the content of the second buffer to the second network device, and may implicitly or explicitly query whether the second network device supports the terminal device in continuing to use the first buffer.

S1009: The second network device updates the third buffer based on the content of the second buffer.

The second network device may place the content of the second buffer into the third buffer, or replace original content of the third buffer with the content of the second buffer, so that a status of the third buffer is consistent with a status of the second buffer. It is also equivalent to making a status of the third buffer before a data packet is compressed consistent with a status of the first buffer when the data packet is decompressed.

S1010: The first network device sends the K compressed data packets to the second network device, and correspondingly, the second network device receives the K compressed data packets from the first network device.

In this embodiment of this application, because the terminal device performs the cell handover, the first network device does not need to decompress the K compressed data packets, but may forward or send the K compressed data packets to the second network device through an interface (for example, an Xn interface) between network devices, so that the second network device processes the K compressed data packets. Alternatively, the first network device may not send the K compressed data packets to the second network device, that is, the first network device forwards only successfully decompressed data packets to the second network device. For example, it can be learned from the description of the embodiment shown in FIG. 7, if the terminal device sends N consecutive compressed data packets from a first compressed data packet for which no ACK is received, the N compressed data packets include the K compressed data packets. In this case, even if the first network device does not send the K compressed data packets to the second network device, the second network device may receive the K compressed data packets from the terminal device. Therefore, S1110 is an optional step.

If the first network device sends the K compressed data packets to the second network device, optionally, after receiving the K compressed data packets, the second network device may send a status report of the K compressed data packets to the terminal device. The status report indicates the compressed data packets that have been received by the second network device, for example, indicates the K compressed data packets. Alternatively, the second network device may not send the status report to the terminal device. In other words, in this embodiment of this application, the first network device and/or the second network device may send the status report of the K compressed data packets to the terminal device. The terminal device may receive the status report of the K compressed data packets from the first network device, or may receive the status report of the K compressed data packets from the second network device, or may receive the status report of the K compressed data packets from both the first network device and the second network device. Alternatively, in this embodiment of this application, neither the first network device nor the second network device may send the status report of the K compressed data packets to the terminal device. In this case, the terminal device does not receive the status report of the K compressed data packets.

In addition, in addition to the K compressed data packets, the first network device may further receive other compressed data packets from the terminal device. The first network device has successfully decompressed these compressed data packets, and the first network device may also send the successfully decompressed data packets to the second network device.

S1011: The terminal device sends the N compressed data packets to the second network device, and correspondingly, the second network device receives the N compressed data packets from the terminal device. The N compressed data packets are a part or all of the M compressed data packets. For example, N is an integer less than or equal to M.

After successfully performing the cell handover, the terminal device may continue to send the data packet to the second network device. Therefore, the terminal device retransmits the N compressed data packets to the second network device. For more content of S1011, refer to S706 in the embodiment shown in FIG. 7.

The foregoing describes a case in which the terminal device and the first network device do not reset the buffer. If second indication information received by the terminal device indicates that the first buffer does not continue to be used, or a protocol specifies that the first buffer does not continue to be used, the terminal device may reset the first buffer when reestablishing the PDCP layer. The first network device also resets the second buffer when reestablishing the PDCP layer. The following describes processing manners of the terminal device and the first network device in this case.

For example, when the PDCP layer of the first network device is reestablished, compressed data packets 3, 4, 5, and 7 have been received, and compressed data packets 1, 2, and 6 have not been received. After the PDCP layer receives the compressed data packets 3, 4, 5, and 7, a PDCP reestablishment indication may trigger decompression of these compressed data packets, and the PDCP layer fails to decompress the compressed data packets 3, 4, 5, and 7. In this case, the PDCP layer discards the compressed data packets 3, 4, 5, and 7, or the PDCP reestablishment indication may trigger the PDCP layer to discard out-of-order compressed data packets (there is a special case in which packets from a transmitting end are uncompressed data packets, even if these data packets are out of order, these data packets do not need to be discarded). That is, the compressed data packets 3, 4, 5, and 7 are not decompressed, but the compressed data packets 3, 4, 5, and 7 are directly discarded. A solution of directly discarding out-of-order compressed data packets can reduce a quantity of decompression times, improve processing efficiency, save energy consumption, and avoid a waste of resources for invalid decompression processing. The first network device only needs to send, to the second network device, a data packet that is correctly decompressed or an out-of-order compressed data packet that is not discarded, and does not need to send, to the second network device, a compressed data packet that fails to be decompressed or that is not decompressed. In addition, after receiving the compressed data packet, the RLC layer of the first network device sends ACK information to the terminal device. For example, for a received compressed data packet, the RLC layer of the first network device sends an ACK to the terminal device.

After completing the cell handover or PDCP layer reestablishment, the terminal device may retransmit the compressed data packet to the second network device. For example, the terminal device sequentially retransmits compressed data packets from a first compressed data packet for which no ACK is received. For example, if the terminal device receives ACKs of the compressed data packets 0, 3, 4, 5, and 7, but does not receive ACKs of the compressed data packets 1, 2, and 6, the terminal device retransmits the compressed data packet 1 to the compressed data packet 7. In a cell handover process, the terminal device reestablishes the PDCP layer, and resets the first buffer. In this case, the terminal device recompresses the data packet based on a reset first buffer. The compressed data packet 1 to the compressed data packet 7 that are previously sent by the terminal device to the second network device are obtained by compressing the data packet 1 to the data packet 7 based on the first buffer before resetting, and the terminal device recompresses the data packet 1 to the data packet 7 based on the reset first buffer, to obtain the compressed data packet 1 to the compressed data packet 7. The terminal device then sends the compressed data packets to the second network device. It can be learned that, if the first buffer does not continue to be used, the terminal device needs to perform compression twice for a same data packet.

S1012: The second network device decompresses the N compressed data packets based on the third buffer, or the second network device decompresses the N compressed data packets and the K compressed data packets based on the third buffer.

For example, if the N compressed data packets include the K compressed data packets, for example, the second network device does not receive the K compressed data packets from the first network device, or the second network device receives the K compressed data packets from the first network device, but the N compressed data packets include the K compressed data packets, it may be understood that the second network device decompresses the N compressed data packets based on the third buffer. For example, the M compressed data packets are the compressed data packet 1 to the compressed data packet 7; the K compressed data packets are the compressed data packets 3, 4, 5, and 7; and the N compressed data packets are the compressed data packet 1 to the compressed data packet 7. In this case, the second network device decompresses the compressed data packet 1 to the compressed data packet 7 based on the third buffer.

For another example, if the N compressed data packets do not include the K compressed data packets, for example, if the second network device receives the K compressed data packets from the first network device, and the N compressed data packets do not include the K compressed data packets, it may be understood that the second network device decompresses the N compressed data packets and the K compressed data packets based on the third buffer. For example, the M compressed data packets are the compressed data packet 1 to the compressed data packet 7; the K compressed data packets are the compressed data packets 3, 4, 5, and 7, and the N compressed data packets are the compressed data packets 1, 2, and 6. In this case, the second network device decompresses the compressed data packet 1 to the compressed data packet 7 based on the third buffer, and the compressed data packet 1 to the compressed data packet 7 are a union set of the K compressed data packets and the N compressed data packets.

According to the technical solutions provided in this embodiment of this application, a quantity of times of compression by the terminal device can be reduced, and processing efficiency of the terminal device can be improved. If the first network device and/or the second network device send or sends the status report to the terminal device, an amount of data transmitted by the terminal device can be reduced, and transmission overheads can be reduced. In addition, because neither the first buffer of the terminal device nor the second buffer of the first network device is reset, and the third buffer of the second network device may also be set based on the second buffer, in a case in which neither the first network device nor the second network device sends the status report to the terminal device, regardless of whether the second network device decompresses the K compressed data packets after receiving the K compressed data packets, or whether the second network device receives the K compressed data packets, the second network device can obtain the M compressed data packets. This reduces a packet loss quantity.

Both the embodiment shown in FIG. 7 and the embodiment shown in FIG. 10 describe an uplink data packet compression process, and use, for example, a UDC technology. Embodiments of this application further provide a downlink data packet compression process, which is described below.

Figure 11:
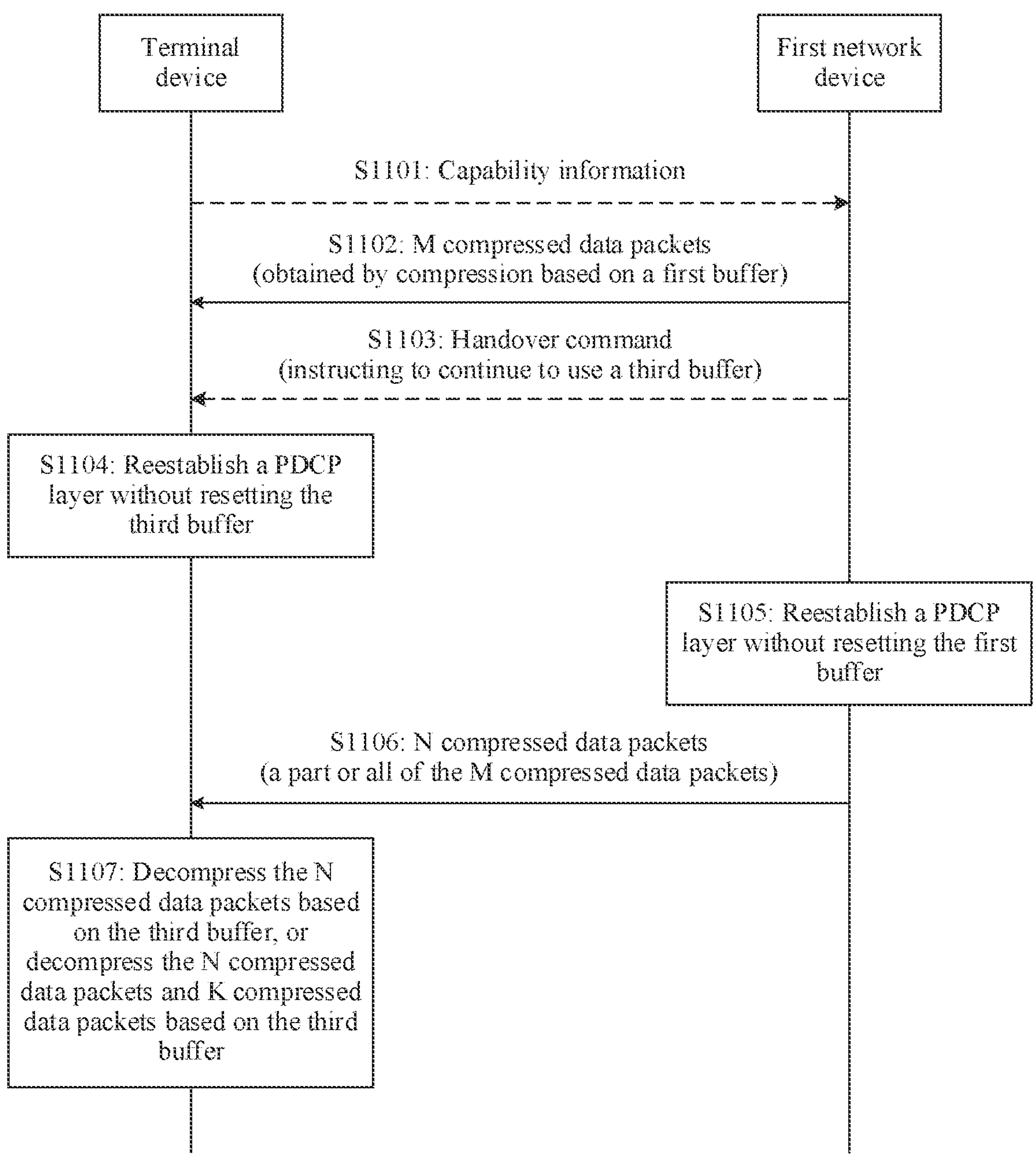
FIG. 11 is a flowchart of a third communication method according to an embodiment of this application.

An embodiment of this application provides a third communication method. FIG. 11 is a flowchart of the method. The method relates to a downlink data packet compression process. In the following description process, an example in which the method is applied to the network architecture shown in FIG. 3 is used. The terminal device described below is, for example, the terminal device in the network architecture shown in FIG. 3, and the first network device described below is, for example, the network device in the network architecture shown in FIG. 3.

S1101: A terminal device sends capability information to a first network device, and correspondingly, the first network device receives the capability information from the terminal device. The capability information may indicate that a third buffer is supported to continue to be used when PDCP reestablishment occurs, or indicate that a third buffer is not supported to continue to be used when PDCP reestablishment occurs; or the capability information may indicate that a third buffer is supported to be not reset when the PDCP layer is reestablished, or indicate that a third buffer is not supported to be not reset when the PDCP layer is reestablished. The third buffer is maintained by the terminal device, and is configured to decompress a data packet. In other words, the terminal device may decompress a data packet based on the third buffer. For example, the terminal device may decompress a received compressed data packet based on the third buffer by using a downlink compression technology.

The first network device can determine, based on the capability information, whether the terminal device supports continuing to use the third buffer. If the terminal device supports continuing to use the third buffer, the first network device may choose, during a handover, whether to indicate the terminal device to continue to use the third buffer. If the terminal device does not support continuing to use the third buffer, the first network device does not indicate the terminal device to continue to use the third buffer. Alternatively, the terminal device may not send the capability information. The first network device may determine, based on another factor, whether to indicate the terminal device to continue to use the third buffer, or whether the terminal device continues to use the third buffer may be specified in a protocol. Therefore, S1101 is an optional step.

For more content of S1101, refer to S701 in the embodiment shown in FIG. 7.

S1102: The first network device sends M compressed data packets to the terminal device, and correspondingly, the terminal device receives K compressed data packets from the first network device. M is a positive integer, and K is a positive integer less than or equal to M. The K compressed data packets may be a part or all of the M compressed data packets, or the K compressed data packets are a subset of the M compressed data packets. The M compressed data packets are obtained by the first network device by compressing M data packets based on a first buffer (or the first buffer in this embodiment of this application may also be referred to as a second buffer). The first buffer is maintained by the first network device, and is used by the first network device to compress a data packet. For example, the first network device may compress a data packet based on the first buffer by using the downlink compression technology.

It should be noted that the first network device may perform corresponding processing on the compressed data packet before sending the compressed data packet. For example, the first network device performs integrity protection and encryption processing (for example, performs corresponding processing at the PDCP layer) on the compressed data packet, and delivers the processed compressed data packet to a bottom layer of the first network device (for example, an RLC layer, a MAC layer, or a physical layer). Then, the bottom layer of the first network device sends the processed compressed data packet. The first network device may send the M compressed data packets in a similar manner, and the first network device (or a second network device) may send N compressed data packets described in the following in a similar manner. Details are not described again.

For more content of S1102, refer to S701 in the embodiment shown in FIG. 7. During reference, roles of the "terminal device" and the "first network device" in S701 may be exchanged.

S1103: The first network device sends a handover command to the terminal device, and correspondingly, the terminal device receives the handover command from the first network device. The handover command may instruct the terminal device to perform a cell handover or PDCP layer reestablishment. Optionally, the handover command may further instruct to continue to use the third buffer when the terminal device reestablishes the PDCP, or instruct not to reset the third buffer when the terminal device reestablishes the PDCP.

For more content of S1103, refer to S703 in the embodiment shown in FIG. 7. During reference, the "first buffer" maintained by the terminal device in S703 may be replaced with the "third buffer", and the "second buffer" maintained by the first network device may be replaced with the "first buffer".

S1104: The terminal device reestablishes the PDCP layer without resetting the third buffer.

For more content of S1104, refer to S704 in the embodiment shown in FIG. 7. During reference, the "first buffer" maintained by the terminal device in S704 may be replaced with the "third buffer".

S1105: The first network device reestablishes the PDCP layer without resetting the first buffer.

For more content of S1105, refer to S705 in the embodiment shown in FIG. 7. During reference, the "second buffer" maintained by the first network device in S705 may be replaced with the "first buffer".

S1106: The first network device sends the N compressed data packets to the terminal device, and correspondingly, the terminal device receives the N compressed data packets from the first network device. The N compressed data packets are a part or all of the M compressed data packets. For example, N is an integer less than or equal to M. The first network device may send the N compressed data packets in ascending order of sequence numbers of the compressed data packets from a first compressed data packet that is not determined to be successfully received by the terminal device.

For more content of S1106, refer to S706 in the embodiment shown in FIG. 7. During reference, roles of the "terminal device" and the "first network device" in S706 may be exchanged, and roles of the "first buffer" and the "third buffer" may be exchanged.

S1107: The terminal device decompresses the N compressed data packets based on the third buffer, or the terminal device decompresses the N compressed data packets and the K compressed data packets based on the third buffer.

For example, if the N compressed data packets include the K compressed data packets, it may be understood that the terminal device decompresses the N compressed data packets based on the third buffer. For example, the M compressed data packets are the compressed data packet 1 to the compressed data packet 7; the K compressed data packets are the compressed data packets 3, 4, 5, and 7; and the N compressed data packets are the compressed data packet 1 to the compressed data packet 7. In this case, the terminal device decompresses the compressed data packet 1 to the compressed data packet 7 based on the third buffer.

For another example, if the N compressed data packets include the K compressed data packets, it may be understood that the terminal device decompresses the N compressed data packets and the K compressed data packets based on the third buffer. For example, the M compressed data packets are the compressed data packet 1 to the compressed data packet 7; the K compressed data packets are the compressed data packets 3, 4, 5, and 7, and the N compressed data packets are the compressed data packets 1, 2, and 6. In this case, the terminal device decompresses the compressed data packet 1 to the compressed data packet 7 based on the third buffer, and the compressed data packet 1 to the compressed data packet 7 are a union set of the K compressed data packets and the N compressed data packets.

According to the technical solutions provided in this embodiment of this application, a quantity of times of compression by the first network device can be reduced, and processing efficiency of the first network device can be improved. If the terminal device sends a status report to the first network device, an amount of data transmitted by the first network device can be reduced, and transmission overheads can be reduced. In addition, because neither the third buffer of the terminal device nor the first buffer of the first network device is reset, when the terminal device does not send the status report to the first network device, regardless of whether the terminal device decompresses the K compressed data packets after receiving the K compressed data packets, the terminal device can obtain the M compressed data packets. This reduces a packet loss quantity.

If second indication information received by the terminal device indicates not to continue to use the third buffer, or a protocol specifies not to continue to use the third buffer, the terminal device may reset the third buffer. The first network device also resets the first buffer. In this case, for a processing manner of the terminal device and the first network device, refer to the description of the embodiment shown in FIG. 7. During reference, roles of the "terminal device" and the "first network device" in the embodiment shown in FIG. 7 may be exchanged.

In this embodiment of this application, the first network device may indicate whether to continue to use the third buffer, and the first network device may correspondingly indicate, based on a specific situation, whether to continue to use the third buffer. For example, for a terminal device with a low capability, the first network device may not indicate to continue to use the third buffer, or may indicate not to continue to use the third buffer, to meet a capability requirement of the terminal device. For another example, in a scenario with a high delay requirement, the first network device may indicate to continue to use the third buffer, and the first network device needs to perform compression only once. This reduces processing time of the first network device, thereby reducing a transmission delay of a data packet. It can be learned that a solution in this embodiment of this application is flexible.

Figure 12:
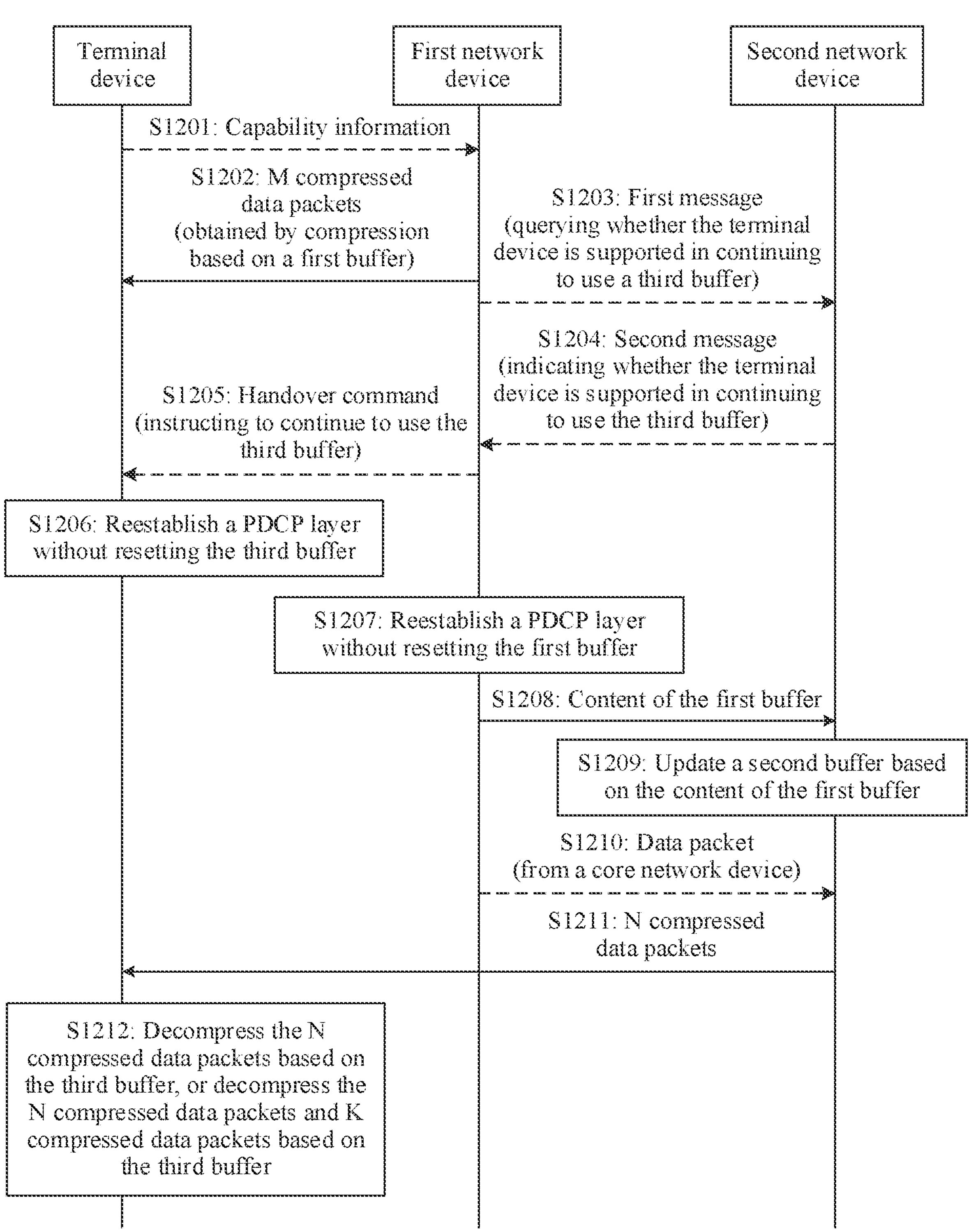
FIG. 12 is a flowchart of a fourth communication method according to an embodiment of this application.

A scenario to which the embodiment shown in FIG. 11 is applied is a co-site scenario, that is, the terminal device accesses a same network device before and after a handover. The following describes a fourth communication method according to an embodiment of this application. The method may be applied to the network architecture shown in FIG. 4. FIG. 12 is a flowchart of the method. The method still relates to a downlink compression process. In the method, a terminal device accesses a first network device before performing a cell handover, and accesses a second network device after performing the cell handover, and the first network device and the second network device are different network devices. The terminal device described below is, for example, the terminal device in the network architecture shown in FIG. 4, the first network device described below is, for example, the network device 1 in the network architecture shown in FIG. 4, and the second network device described below is, for example, the network device 2 in the network architecture shown in FIG. 4.

S1201: A terminal device sends capability information to a first network device, and correspondingly, the first network device receives the capability information from the terminal device.

For more content of S1201, refer to S701 in the embodiment shown in FIG. 7.

S1202: The first network device sends M compressed data packets to the terminal device, and correspondingly, the terminal device receives K compressed data packets from the first network device. M is a positive integer, and K is a positive integer less than or equal to M. The K compressed data packets may be a part or all of the M compressed data packets, or the K compressed data packets are a subset of the M compressed data packets. The M compressed data packets are obtained by the first network device by compressing M data packets based on a first buffer. The first buffer is maintained by the first network device, and is used by the first network device to compress a data packet. For example, the first network device may compress a data packet based on the first buffer by using a downlink compression technology.

For more content of S1202, refer to S701 in the embodiment shown in FIG. 7. During reference, roles of the "terminal device" and the "first network device" in S701 may be exchanged.

S1203: The first network device sends a first message to a second network device, and correspondingly, the second network device receives the first message from the first network device. The first message may be used to query whether the terminal device is supported in continuing to use a third buffer, or the first message may be used to query whether the terminal device is supported in not resetting a third buffer when reestablishing a PDCP layer. The third buffer is a buffer that is maintained by the terminal device and used to decompress a data packet. If the third buffer is reset, content of the third buffer that is maintained by the terminal device and used to decompress the data packet is in a state existing after the third buffer is reset. For example, the third buffer is filled with a predefined dictionary. In addition, the second network device maintains a second buffer. The second buffer is used by the second network device to compress a data packet. For example, the second network device may compress a data packet based on the second buffer.

The first buffer, the second buffer, and the third buffer are all in a correspondence. The first buffer is maintained by the first network device. The terminal device accesses the first network device before performing a cell handover, and the first network device compresses the data packet based on the first buffer. The second buffer is maintained by the second network device. The terminal device accesses the second network device after performing the cell handover, and the second network device may compress the data packet based on the second buffer. The third buffer is maintained by the terminal device. The terminal device may decompress, based on the third buffer, a compressed data packet from the first network device and/or the second network device. In other words, the terminal device may decompress, based on the third buffer, a data packet compressed based on the first buffer, and/or decompress, based on the third buffer, a data packet compressed based on the second buffer.

For example, the first message is a handover request message, and it may be understood that the handover request message includes inquiry information. The inquiry information may be used to query whether the terminal device is supported in continuing to use the third buffer, or query whether the terminal device is supported in not resetting the third buffer when reestablishing the PDCP layer. Alternatively, the first message may be another message.

S1204: The second network device sends a second message to the first network device, and correspondingly, the first network device receives the second message from the second network device. The second message may indicate that the terminal device is supported in continuing to use the third buffer, or indicate that the terminal device is not supported in continuing to use the third buffer. For example, the second message is a handover request response message, and it may be understood that the handover request response message includes third indication information. The third indication information may indicate that continuing to use the third buffer is supported, or indicate that continuing to use the third buffer is not supported. Alternatively, the second message may be another message.

Alternatively, the first network device may not need to learn whether the second network device supports the terminal device in continuing to use the third buffer, or the first network device may learn, in another manner, whether the second network device supports the terminal device in continuing to use the third buffer. Therefore, S1203 and S1204 are optional steps.

S1205: The first network device sends a handover command to the terminal device, and correspondingly, the terminal device receives the handover command from the first network device. The handover command may instruct the terminal device to perform the cell handover.

For more content of S1205, refer to S703 in the embodiment shown in FIG. 7. During reference, the "first buffer" maintained by the terminal device in S703 may be replaced with the "third buffer", and the "second buffer" maintained by the first network device may be replaced with the "first buffer".

S1206: The terminal device reestablishes the PDCP layer without resetting the third buffer.

For more content of S1206, refer to S704 in the embodiment shown in FIG. 7. During reference, the "first buffer" maintained by the terminal device in S704 may be replaced with the "third buffer".

S1207: The first network device reestablishes the PDCP layer without resetting the first buffer.

For more content of S1207, refer to S705 in the embodiment shown in FIG. 7. During reference, the "second buffer" maintained by the first network device in S705 may be replaced with the "first buffer".

S1208: The first network device sends content of the first buffer to the second network device, and correspondingly, the second network device receives the content of the first buffer from the first network device. For example, the first network device may send indication information to the second network device. To distinguish from the foregoing indication information, the indication information may also be referred to as fourth indication information, and the fourth indication information may indicate the content of the first buffer. For example, the fourth indication information includes the content of the first buffer (for example, depending on a size of the first buffer, a common configuration of a size of the content of the first buffer is 2k bytes, 4k bytes, or 8k bytes), or the fourth indication information does not include the content of the first buffer, but the second network device may determine the content of the first buffer based on the fourth indication information.

Alternatively, a same message is used in S1208 and S1203. The first network device sends content of the second buffer to the second network device, and may implicitly or explicitly query whether the second network device supports the terminal device in continuing to use the third buffer.

If the second network device supports the terminal device in continuing to use the third buffer, the first network device may send the fourth indication information to the second network device, or if the second network device does not support the terminal device in continuing to use the third buffer, the first network device may not need to send the fourth indication information to the second network device. Therefore, S1208 is an optional step.

S1209: The second network device updates the second buffer based on the content of the first buffer.

The second network device may replace original content of the second buffer with the content of the first buffer, so that a status of the second buffer is consistent with a status of the first buffer. It is also equivalent to making a status of the second buffer before a data packet is compressed consistent with a status of the third buffer when the data packet is decompressed.

S1210: The first network device forwards data packets from a core network device to the second network device, and correspondingly, the second network device receives the data packets from the first network device. For example, these data packets include a data packet (SDU) compressed by the first network device, and/or include an uncompressed data packet (SDU).

Before the terminal device performs the cell handover, a data packet received from the first network device is a data packet from the core network device (for example, a UPF user plane function). When the terminal device is handed over from the first network device to the second network device, a subsequent data packet of the terminal device is transmitted from the core network device to the second network device. When the terminal device performs the cell handover, for a data packet that has been sent by the first network device but has not been successfully received by the terminal device, the first network device forwards the data packet to the second network device from a data packet with a smallest sequence number and for which no ACK from the terminal device is received. That is, the first network device forwards, to the second network device, a data packet for which no ACK from the terminal device is received. The part of the data packet forwarded to the second network device may include a data packet that has been compressed by the first network device, and/or include a data packet that has not been compressed by the first network device.

If the first network device does not receive a data packet that is from a core network and that needs to be sent to the terminal device, or the first network device has sent, to the terminal device, all data packets that are from the core network device and that need to be sent to the terminal device, and has received ACKs from the terminal device, S1210 does not need to be performed. Therefore, S1210 is an optional step.

S1211: The second network device sends N compressed data packets to the terminal device, and correspondingly, the terminal device receives the N compressed data packets from the second network device. The N compressed data packets are a part or all of the M compressed data packets. For example, N is an integer less than or equal to M. The second network device may send the N compressed data packets in ascending order of sequence numbers of the compressed data packets from a first compressed data packet that is not determined to be successfully received by the terminal device.

After the terminal device successfully performs the cell handover, the second network device continues to send a data packet to the terminal device. Because the terminal device has a compressed data packet that is not successfully received before the cell handover, the second network device sends the N compressed data packets to the terminal device. For example, after updating the second buffer, the second network device may compress N data packets based on an updated second buffer to obtain the N compressed data packets, and then send the N compressed data packets to the terminal device. A part or all of the N data packets are, for example, sent by the first network device to the second network device, or the N data packets may be obtained by the second network device from the core network device. For more content of S1211, refer to S1011 in the embodiment shown in FIG. 10. During reference, roles of the "terminal device" and the "second network device" may be exchanged. In addition, during reference, if a status report is involved, the status report in this embodiment of this application may indicate the K compressed data packets. The status report may be sent by the terminal device to the first network device. The first network device may send the status report to the second network device. Alternatively, the status report may be sent by the terminal device to the second network device.

S1212: The terminal device decompresses the N compressed data packets based on the third buffer, or the terminal device decompresses the N compressed data packets and the K compressed data packets based on the third buffer.

For more content of S1212, refer to S1107 in the embodiment shown in FIG. 11.

The foregoing describes a case in which the terminal device and the first network device do not reset the buffer. If the second indication information received by the terminal device indicates that the terminal device does not continue to use the third buffer, or a protocol specifies that the terminal device does not continue to use the third buffer, the terminal device may reset the third buffer, and the first network device also resets the first buffer. The following describes processing manners of the terminal device and the first network device in this case.

For example, when the PDCP layer of the terminal device is reestablished, compressed data packets 3, 4, 5, and 7 have been received, and compressed data packets 1, 2, and 6 have not been received. After the PDCP layer receives the compressed data packets 3, 4, 5, and 7, a PDCP reestablishment indication may trigger decompression of these compressed data packets, and the PDCP layer fails to decompress the compressed data packets 3, 4, 5, and 7. In this case, the PDCP layer discards the compressed data packets 3, 4, 5, and 7, or the PDCP reestablishment indication may trigger the PDCP layer to discard out-of-order compressed data packets (there is a special case in which packets from a transmitting end are uncompressed data packets, even if these data packets are out of order, these data packets do not need to be discarded). That is, the compressed data packets 3, 4, 5, and 7 are not decompressed, but the compressed data packets 3, 4, 5, and 7 are directly discarded. The solution of directly discarding out-of-order compressed data packets can reduce a quantity of decompression times, improve processing efficiency, save energy consumption, and avoid a waste of resources for invalid decompression processing. In addition, after receiving the compressed data packet, the RLC layer of the terminal device sends ACK information to the first network device. For example, for a received compressed data packet, the RLC layer of the terminal device sends an ACK to the first network device.

After the terminal device completes the cell handover or PDCP layer reestablishment, the second network device may retransmit the compressed data packet to the terminal device. For example, the second network device sequentially retransmits compressed data packets from a first compressed data packet for which no ACK is received. For example, if the second network device receives ACKs of compressed data packets 0, 3, 4, 5, and 7, but does not receive ACKs of the compressed data packets 1, 2, and 6, the second network device retransmits the compressed data packet 1 to the compressed data packet 7. In a cell handover process, the second network device reestablishes the PDCP layer, and resets the second buffer. In this case, the second network device compresses the data packet based on a reset second buffer. The compressed data packet 1 to the compressed data packet 7 that are previously sent by the second network device to the terminal device are obtained by compressing a data packet 1 to a data packet 7 based on the second buffer before resetting, and the second network device recompresses the data packet 1 to the data packet 7 based on the reset second buffer, to obtain the compressed data packet 1 to the compressed data packet 7. The second network device then sends the compressed data packets to the terminal device. It can be learned that, if the third buffer does not continue to be used, for a same data packet, the first network device needs to perform compression, and the second network device needs to perform compression again.

According to the technical solutions provided in this embodiment of this application, a quantity of times of compression by a network device can be reduced, and processing efficiency of the network device can be improved. If the terminal device sends a status report to the network device, an amount of data transmitted by the network device can be reduced, and transmission overheads can be reduced.

Figure 13:
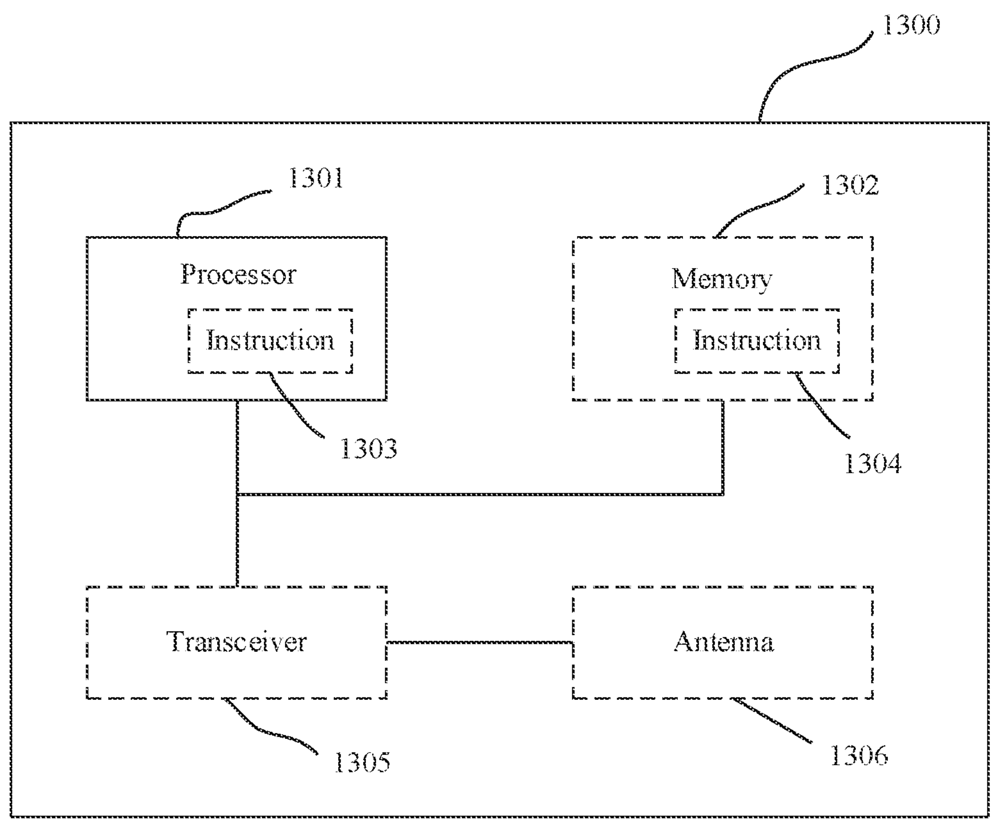
FIG. 13 is a schematic block diagram of a communication apparatus according to an embodiment of this application.

FIG. 13 is a schematic diagram of a structure of a communication apparatus 1300 according to an embodiment of this application. The communication apparatus 1300 may be the terminal device in any one of the embodiment shown in FIG. 7, the embodiment shown in FIG. 10, the embodiment shown in FIG. 11, or the embodiment shown in FIG. 12, and is configured to implement the method performed by the terminal device in the foregoing method embodiment. Alternatively, the communication apparatus 1300 may be the first network device in any one of the embodiment shown in FIG. 7, the embodiment shown in FIG. 10, the embodiment shown in FIG. 11, or the embodiment shown in FIG. 12, and is configured to implement the method corresponding to the first network device in the foregoing method embodiment. Alternatively, the communication apparatus 1300 may be the second network device in any one of the embodiment shown in FIG. 7, the embodiment shown in FIG. 10, the embodiment shown in FIG. 11, or the embodiment shown in FIG. 12, and is configured to implement the method corresponding to the second network device in the foregoing method embodiment. For a specific function, refer to the description in the foregoing method embodiment.

The communication apparatus 1300 includes one or more processors 1301. The processor 1301 may also be referred to as a processing unit, and may implement a specific control function. The processor 1301 may be a general-purpose processor, a dedicated processor, or the like, for example, includes a baseband processor, a central processing unit, an application processor, a modem processor, a graphics processing unit, an image signal processor, a digital signal processor, a video codec processor, a controller, a memory, and/or a neural-network processing unit. The baseband processor may be configured to process a communication protocol and communication data. The central processing unit may be configured to control the communication apparatus 1300, execute software programs, and/or process data. Different processors may be independent components, or may be integrated into one or more processors, for example, integrated into one or more application-specific integrated circuits.

Optionally, the communication apparatus 1300 includes one or more memories 1302, configured to store instructions 1304, and the instructions 1304 may be run on the processor, so that the communication apparatus 1300 performs the method described in the foregoing method embodiment. Optionally, the memory 1302 may further store data. The processor and the memory may be separately disposed, or may be integrated together.

Optionally, the communication apparatus 1300 may include instructions 1303 (sometimes may also be referred to as code or programs), and the instructions 1303 may be run on the processor, so that the communication apparatus 1300 performs the method described in the foregoing embodiment. The processor 1301 may store data.

Optionally, the communication apparatus 1300 may further include a transceiver 1305 and an antenna 1306. The transceiver 1305 may be referred to as a transceiver unit, a transceiver machine, a transceiver circuit, a transceiver, an input/output interface, or the like, and is configured to implement a transceiver function of the communication apparatus 1300 through the antenna 1306.

Optionally, the communication apparatus 1300 may further include one or more of the following components: a wireless communication module, an audio module, an external memory interface, an internal memory, a universal serial bus (universal serial bus, USB) interface, a power management module, an antenna, a speaker, a microphone, an input/output module, a sensor module, a motor, a camera, a display, or the like. It may be understood that, in some embodiments, the communication apparatus 1300 may include more or fewer components, or some components may be integrated, or some components may be split. These components may be hardware, software, or a combination of software and hardware.

The processor 1301 and the transceiver 1305 described in this embodiment of this application may be implemented in an integrated circuit (integrated circuit, IC), an analog IC, a radio frequency integrated circuit (radio frequency identification, RFID), a hybrid signal IC, an application-specific integrated circuit (application-specific integrated circuit, ASIC), a printed circuit board (printed circuit board, PCB), an electronic device, or the like. The communication apparatus described in this specification may be implemented as an independent device (for example, an independent integrated circuit, and a mobile phone), or may be a part of a larger device (for example, a module that can be embedded in another device). For details, refer to the foregoing descriptions of the terminal device and the network device. Details are not described herein again.

An embodiment of this application provides a terminal device. The terminal device (referred to as UE for ease of description) may be used in the foregoing embodiments. The terminal device includes a corresponding means (means), unit, and/or circuit used to implement a function of the terminal device in the embodiment shown in any one or more of FIG. 7, FIG. 10, FIG. 11, or FIG. 12. For example, the terminal device includes: a transceiver module, configured to support the terminal device in implementing a transceiver function, and a processing module, configured to support the terminal device in processing a signal.

Figure 14:
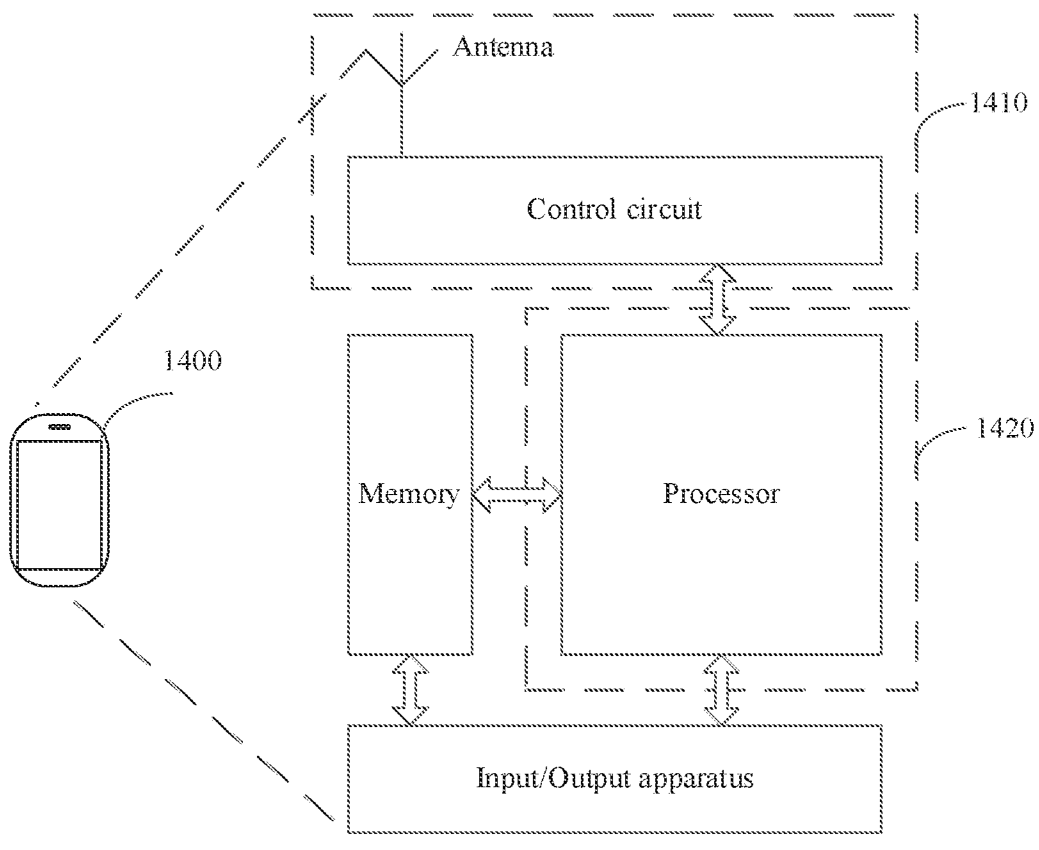
FIG. 14 is a schematic block diagram of a terminal device according to an embodiment of this application.

FIG. 14 is a schematic diagram of a structure of a terminal device according to an embodiment of this application.

The terminal device 1400 is applicable to the architecture shown in FIG. 3 or FIG. 4. For ease of description, FIG. 14 shows only main components of the terminal device 1400. As shown in FIG. 14, the terminal device 1400 includes a processor, a memory, a control circuit, an antenna, and an input/output apparatus. The processor is mainly configured to: process a communication protocol and communication data, control the entire terminal device 1400, execute a software program, and process data of the software program. The memory is mainly configured to store the software program and data. The control circuit is mainly configured to convert a baseband signal and a radio frequency signal and process the radio frequency signal. The antenna is mainly configured to receive and send a radio frequency signal in a form of an electromagnetic wave. The input/output apparatus, such as a touchscreen, a display, a microphone, or a keyboard, is mainly configured to: receive data input by a user and output data to the user.

That the terminal device 1400 is a mobile phone is used as an example. After the terminal device 1400 is powered on, the processor may read a software program in a storage unit, interpret and execute instructions of the software program, and process data of the software program. When data needs to be sent wirelessly, the processor outputs a baseband signal to the control circuit after performing baseband processing on to-be-sent data. After performing radio frequency processing on the baseband signal, the control circuit sends a radio frequency signal in an electromagnetic wave form through the antenna. When data is sent to the terminal device 1400, the control circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 14 shows only one memory and only one processor. In some embodiments, the terminal device 1400 may include a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to: control the entire terminal device 1400, execute the software program, and process the data of the software program. The processor in FIG. 14 integrates functions of the baseband processor and the central processing unit. A person skilled in the art may understand that the baseband processor and the central processing unit may alternatively be separate processors, and are interconnected by using a technology such as a bus. The terminal device 1400 may include a plurality of baseband processors to adapt to different network standards, and the terminal device 1400 may include a plurality of central processing units to enhance a processing capability of the terminal device 1400. Components of the terminal device 1400 may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a transceiver function may be considered as a transceiver unit 1410 of the terminal device 1400, and the processor having a processing function may be considered as a processing unit 1420 of the terminal device 1400. As shown in FIG. 14, the terminal device 1400 includes the transceiver unit 1410 and the processing unit 1420. The transceiver unit may also be referred to as a transceiver, a transceiver machine, a transceiver apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. That is, the transceiver unit 1410 includes the receiving unit and the sending unit. For example, the receiving unit may also be referred to as a receiver, a receive machine, or a receiving circuit, and the sending unit may also be referred to as a transmitter, a transmitting machine, or a transmitting circuit.

An embodiment of this application further provides a network device. The network device may be used in the foregoing embodiments. The network device includes a means (means), unit, and/or circuit for implementing the functions of, for example, the first network device, in the embodiment shown in any one or more of FIG. 7, FIG. 10, FIG. 11, or FIG. 12. Alternatively, the network device includes a means (means), unit, and/or circuit for implementing the functions of, for example, the second network device, in the embodiment shown in any one or more of FIG. 7, FIG. 10, FIG. 11, or FIG. 12. For example, the network device includes; a transceiver module, configured to support the network device in implementing a transceiver function, and a processing module, configured to support the network device in processing a signal.

Figure 15:
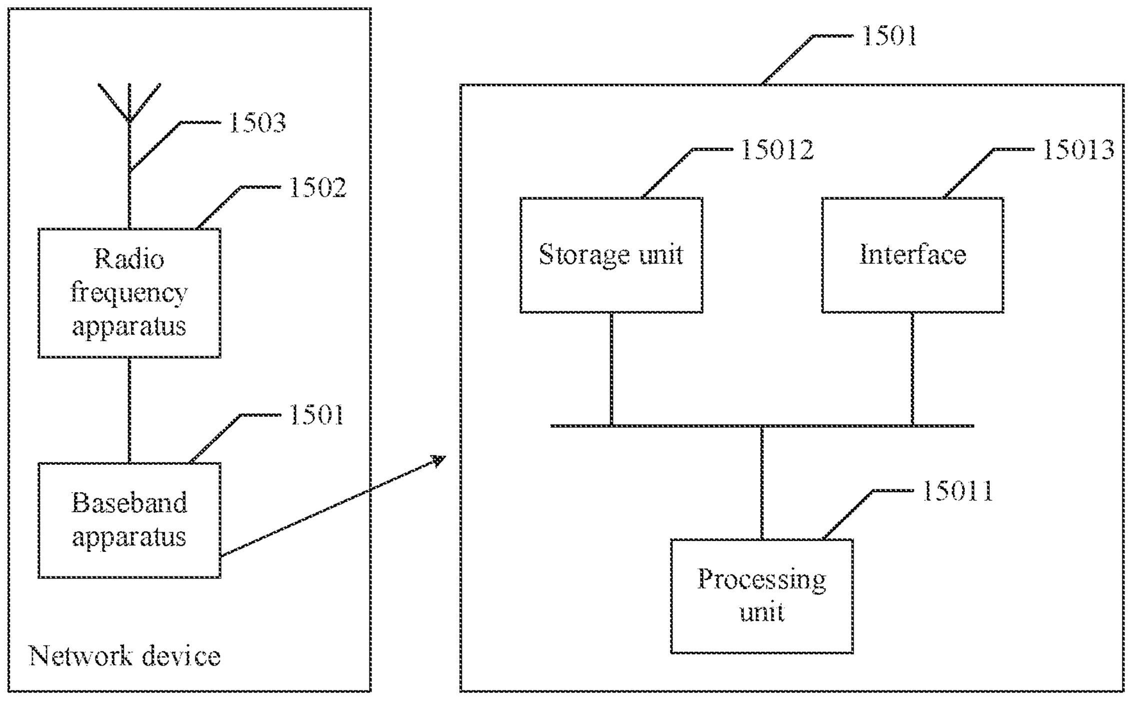
FIG. 15 is a schematic block diagram of a network device according to an embodiment of this application.

FIG. 15 is a schematic diagram of a structure of a network device according to an embodiment of this application. As shown in FIG. 15, the network device is applicable to the architecture shown in FIG. 3 or FIG. 4. The network device includes a baseband apparatus 1501, a radio frequency apparatus 1502, and an antenna 1503. In an uplink direction, the radio frequency apparatus 1502 receives, through the antenna 1503, information sent by a terminal device, and sends the information sent by the terminal device to the baseband apparatus 1501 for processing. In a downlink direction, the baseband apparatus 1501 processes information of the terminal device, and sends the information to the radio frequency apparatus 1502. The radio frequency apparatus 1502 processes the information of the terminal device, and then sends the processed information to the terminal device through the antenna 1503.

The baseband apparatus 1501 includes one or more processing units 15011, a storage unit 15012, and an interface 15013. The processing unit 15011 is configured to support the network device in performing a function of the network device in the foregoing method embodiment. The storage unit 15012 is configured to store a software program and/or data. The interface 15013 is configured to exchange information with the radio frequency apparatus 1502. The interface includes an interface circuit, configured to input and output information. In an implementation, the processing unit is an integrated circuit, for example, one or more ASICs, one or more DSPs, one or more FPGAs. or a combination of these types of integrated circuits. These integrated circuits may be integrated together to form a chip. The storage unit 15012 and the processing unit 15011 may be located in a same chip, that is, an on-chip storage element. Alternatively, the storage unit 15012 and the processing unit 15011 may be located in different chips, that is, an off-chip storage element. The storage unit 15012 may be one memory, or may be a general name of a plurality of memories or storage elements.

The network device may implement some or all of the steps in the foregoing method embodiments in a form of scheduling programs by one or more processing units. For example, a corresponding function of the first network device and/or the second network device in the embodiment shown in any one or more of FIG. 7, FIG. 10, FIG. 11, or FIG. 12 is implemented. The one or more processing units may support radio access technologies of a same standard, or may support radio access technologies of different standards.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus and method may be implemented in other manners. For example, the described apparatus embodiment is merely an example. For example, the unit division is merely logical function division, units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The computer-readable storage medium may be any usable medium that can be accessed by a computer. This is used as an example, but constitutes no limitation. The computer-readable medium may include a random access memory (random access memory, RAM), a read-only memory (read-only memory, ROM), a programmable read-only memory (programmable ROM, PROM), an erasable programmable read-only memory (erasable PROM, EPROM), an electrically erasable programmable read-only memory (electrically erasable programmable read-only memory, EEPROM), a compact disc read-only memory (compact disc read-only memory. CD-ROM), a universal serial bus flash disk (universal serial bus flash disk), a removable hard disk, another optical disc storage, a magnetic disk storage medium, another magnetic storage device, or any other medium that can be configured to carry or store expected program code in a form of an instruction or a data structure and that can be accessed by a computer. In addition, based on description used as an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), or a direct rambus random access memory (direct rambus RAM, DR RAM).

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A method applied to a terminal device or chip for the terminal device, and comprising:

obtaining M compressed data packets by compressing M data packets based on a first buffer, wherein M is a positive integer;

sending the M compressed data packets;

receiving a first indication information and a second indication information, wherein the first indication information indicates to reestablish a packet data convergence protocol layer, and wherein the second indication information indicates to continue to use the first buffer;

reestablishing the packet data convergence protocol layer without resetting the first buffer; and sending N compressed data packets, wherein the N compressed data packets are at least a portion of the M compressed data packets, and wherein N is a positive integer less than or equal to M.

2. The method of claim 1, wherein a first data packet with a smallest sequence number in the N compressed data packets is the same as a second data packet with a smallest sequence number in data packets that are not successfully received by a network device.

3. The method of claim 1, further comprising sending capability information indicating that continuing to use the first buffer is supported.

4. The method of claim 1, wherein receiving the first indication information and the second indication information comprises receiving a handover command, wherein the handover command includes the first indication information and the second indication information.

5. The method of claim 1, wherein sending the M compressed data packets comprises sending the M compressed data packets to a first network device, and wherein sending the N compressed data packets comprises sending the N compressed data packets to the first network device.

6. The method of claim 4, wherein sending the M compressed data packets comprises sending the M compressed data packets to a first network device, wherein the method further comprises:

accessing the first network device before the terminal device performs a cell handover based on the handover command; and accessing a second network device after the terminal device performs the cell handover, wherein sending the N compressed data packets comprises sending the N compressed data packets to the second network device.

7. A method applied to a first network device or a chip for the first network device, and comprising:

receiving K compressed data packets from a terminal device, wherein the K compressed data packets are based on compression of K data packets and based on a first buffer, and wherein K is a positive integer;

sending a first indication information and a second indication information, wherein the first indication information indicates the terminal device to reestablish a packet data convergence protocol layer, and wherein the second indication information indicates the terminal device to continue to use the first buffer;

reestablishing the packet data convergence protocol layer without resetting a second buffer; and decompressing, using the second buffer, one of the K compressed data packets.

8. The method of claim 7, further comprising:

sending the K compressed data packets to a second network device; and receiving, from the terminal device, an access request before the terminal device performs a cell handover.

9. The method of claim 8, further comprising:

sending indication information to the second network device, wherein the indication information indicates content of the second buffer, wherein the content of the second buffer updates a third buffer; and receiving, from the terminal device, the access request before the terminal device performs the cell handover.

10. The method of claim 8, further comprising:

sending, to the second network device, a first message querying whether the terminal device is supported in continuing to use the first buffer;

receiving, from the terminal device, the access request before the terminal device performs the cell handover; and receiving, from the second network device, a second message indicating that the terminal device is supported in continuing to use the first buffer.

11. The method of claim 7, further comprising sending, to the terminal device, a status report indicating that the first network device has received the K compressed data packets.

12. The method of claim 11, further comprising receiving N compressed data packets from the terminal device, wherein the N compressed data packets are a part or all of M compressed data packets, wherein the K compressed data packets are a part or all of the M compressed data packets, wherein sequence numbers of the M compressed data packets are consecutive, wherein the M compressed data packets are based on compression of M data packets and based on the first buffer, wherein M is a positive integer, wherein N is a positive integer less than or equal to M, and wherein K is a positive integer less than or equal to M.

13. The method of claim 12, wherein a first data packet with a smallest sequence number in the N compressed data packets is the same as a second data packet with a smallest sequence number in data packets that are not successfully received by the first network device.

14. The method of claim 7, further comprising receiving, from the terminal device, capability information indicating that the terminal device supports continuing to use the first buffer.

15. A communication apparatus comprising:

at least one processor; and at least one memory coupled to the at least one processor and storing programming instructions for execution by the at least one processor to:

obtain M compressed data packets by compressing M data packets based on a first buffer, wherein M is a positive integer;

send the M compressed data packets;

receive a first indication information and a second indication information, wherein the first indication information indicates to reestablish a packet data convergence protocol layer, and wherein the second indication information indicates to continue to use the first buffer;

reestablish the packet data convergence protocol layer without resetting the first buffer; and send N compressed data packets, wherein the N compressed data packets are at least a portion of the M compressed data packets, and wherein N is a positive integer less than or equal to M.

16. The communication apparatus of claim 15, wherein a first data packet with a smallest sequence number in the N compressed data packets is the same as a second data packet with a smallest sequence number in data packets that are not successfully received by a network device.

17. The communication apparatus of claim 15, wherein the at least one processor is further configured to execute the programming instructions to send capability information indicating that continuing to use the first buffer is supported.

18. The communication apparatus of claim 15, wherein the at least one processor is further configured to execute the programming instructions to receive the first indication information and the second indication information by receiving a handover command, wherein the handover command includes the first indication information and the second indication information.

19. The communication apparatus of claim 18, wherein the at least one processor is further configured to execute the programming instructions to send the M compressed data packets to a first network device by:

accessing the first network device before the communication apparatus performs a cell handover based on the handover command; and accessing a second network device after the communication apparatus performs the cell handover, and wherein the at least one processor to is further configured to execute the programming instructions to send the N compressed data packets by sending the N compressed data packets to the second network device.

20. The communication apparatus of claim 15, wherein the at least one processor is further configured to execute the programming instructions to:

send the M compressed data packets by sending the M compressed data packets to a first network device; and send the N compressed data packets by sending the N compressed data packets to the first network device.

* * * * *